United States Patent
Kawamura et al.

(10) Patent No.: US 7,559,031 B2
(45) Date of Patent: Jul. 7, 2009

(54) VIDEO DISPLAY APPARATUS, VIDEO COMPOSITION DELIVERY APPARATUS, AND SYSTEM

(75) Inventors: Takuya Kawamura, Kawasaki (JP); Naohisa Shibuya, Kawasaki (JP); Nobuhiko Sugasawa, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 734 days.

(21) Appl. No.: 11/335,823

(22) Filed: Jan. 20, 2006

(65) Prior Publication Data
US 2006/0170763 A1      Aug. 3, 2006

(30) Foreign Application Priority Data
Jan. 24, 2005   (JP)   ............... 2005-015929

(51) Int. Cl.
*G06F 3/00*      (2006.01)
(52) U.S. Cl. .................. 715/753; 715/722; 715/756; 348/14.08; 348/14.09; 709/204; 709/205; 370/260
(58) Field of Classification Search .......... 715/722, 715/753, 756; 370/260, 261, 262, 263, 264, 370/265, 266, 267, 268, 269, 270, 271; 709/204, 709/203, 205, 206, 207; 348/14.08, 14.09, 348/14.1, 14.11, 14.14, 14.15, 14.16
See application file for complete search history.

(56) References Cited

U.S. PATENT DOCUMENTS

| | | | |
|---|---|---|---|
| 5,159,667 A | 10/1992 | Borrey et al. | |
| 5,467,450 A | 11/1995 | Coelho | |
| 5,487,143 A | 1/1996 | Southgate | |
| 5,572,647 A | 11/1996 | Blades | |
| 5,675,755 A | 10/1997 | Trueblood | |
| 5,689,665 A | 11/1997 | Mitsui et al. | |
| 5,764,277 A * | 6/1998 | Loui et al. | ............... 348/14.01 |
| 5,796,402 A | 8/1998 | Ellison-Taylor | |
| 5,889,932 A | 3/1999 | Adegeest et al. | |
| 6,031,530 A | 2/2000 | Trueblood | |
| 6,760,638 B1 | 7/2004 | Love et al. | |
| 7,050,112 B2 * | 5/2006 | Rieder et al. | ............... 348/565 |

(Continued)

FOREIGN PATENT DOCUMENTS

JP   5-103324   4/1993

(Continued)

*Primary Examiner*—Weilun Lo
*Assistant Examiner*—Rashedul Hassan
(74) *Attorney, Agent, or Firm*—Nixon & Vanderhye, PC

(57) ABSTRACT

There is provided with a video display apparatus comprising: a receiving unit configured to receive a composite video image generated from a plurality of video sources; a display unit configured to display the received composite video image; an area manager configured to store area information pieces; a position specification unit configured to specify a position on the composite video image; an area selection unit configured to select an area information piece from the area information pieces; an area display unit configured to provide information indicating the area represented by the selected area information piece to the display unit so as to superpose the information on the displayed composite video image; an area change unit configured to change the information; an area information update unit configured to update the selected area information piece; and a transmission unit configured to transmit an update control signal containing the area information piece after update.

16 Claims, 36 Drawing Sheets

U.S. PATENT DOCUMENTS

| | | | |
|---|---|---|---|
| 2004/0008635 A1* | 1/2004 | Nelson et al. | 370/260 |
| 2004/0261037 A1 | 12/2004 | Ording et al. | |
| 2005/0125742 A1 | 6/2005 | Grotjohn et al. | |
| 2005/0188321 A1* | 8/2005 | Adams et al. | 715/759 |
| 2005/0264648 A1* | 12/2005 | Ivashin et al. | 348/14.09 |
| 2005/0286444 A1* | 12/2005 | Yang et al. | 370/261 |
| 2006/0158510 A1* | 7/2006 | Lia et al. | 348/14.08 |
| 2006/0192848 A1* | 8/2006 | Ni | 348/14.08 |
| 2006/0274195 A1* | 12/2006 | Eshkoli | 348/445 |
| 2007/0120967 A1* | 5/2007 | Eshkoli et al. | 348/14.08 |

FOREIGN PATENT DOCUMENTS

| | | |
|---|---|---|
| JP | 8-297617 | 11/1996 |
| JP | 9-81107 | 3/1997 |
| JP | 9-149396 | 6/1997 |
| JP | 2004-234426 | 8/2004 |

* cited by examiner

| ID | x | y | w | h | Layer |
|----|---|---|---|---|-------|
|    |   |   |   |   |       |

FIG. 7A

| ID  | x  | y  | w  | h  | Layer |
|-----|----|----|----|----|-------|
| ID1 | x1 | y1 | w1 | h1 | l1    |
| ID2 | x2 | y2 | w2 | h2 | l2    |
| ⋮   | ⋮  | ⋮  | ⋮  | ⋮  | ⋮     |
| IDk | xk | yk | wk | hk | lk    |

FIG. 7B

| ID | x | y | w | h | Layer |
|----|---|---|-----|-----|-------|
| 1  | 0 | 0 | 100 | 100 | 1     |

FIG. 8A

| ID | x | y | w | h | Layer |
|----|---|---|-----|-----|-------|
| 1  | 0 | 0 | 100 | 100 | 2     |
| 2  | 0 | 0 | 100 | 100 | 1     |

FIG. 8B

| ID | x | y | w | h | Layer |
|---|---|---|---|---|---|
| ID1 | x1 | y1 | w1 | h1 | l1 |
| ID2 | x2 | y2 | w2 | h2 | l2 |
| ⋮ | ⋮ | ⋮ | ⋮ | ⋮ | ⋮ |
| IDk | xk | yk | wk | hk | lk |

| ID | x | y | w | h | Layer |
|---|---|---|---|---|---|
| ID1 | X1 | Y1 | W1 | H1 | L1 |
| ID2 | x2 | y2 | w2 | h2 | l2 |
| ⋮ | ⋮ | ⋮ | ⋮ | ⋮ | ⋮ |
| IDk | xk | yk | wk | hk | lk |

| ID | x | y | w | h | Layer | | |
|---|---|---|---|---|---|---|---|
| 1 | 0 | 0 | 100 | 100 | 1 | 15 | 20 | x1, y1

FIG. 12

| ID | x | y | w | h | Layer |
|---|---|---|---|---|---|
| 2 | 10 | 20 | 50 | 50 | 3 |

FIG. 13

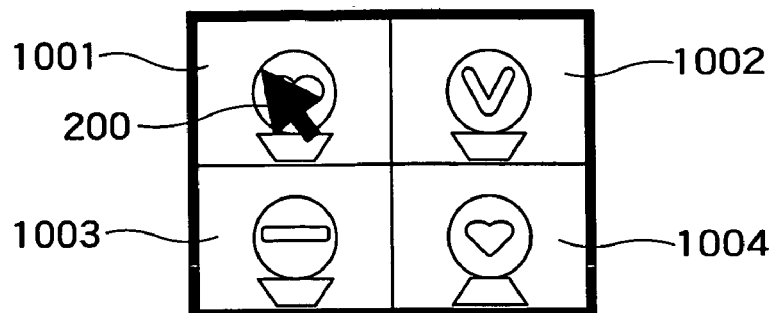
FIG. 14A
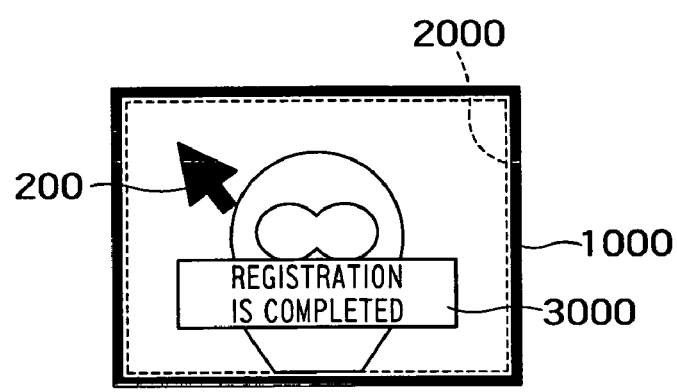
FIG. 14B
| 1 | 0 | 0 | 100 | 100 | 1 | 15 | 20 |
FIG. 14C
| ID | x | y | w | h | Layer |
|---|---|---|---|---|---|
| 1 | 0 | 0 | 100 | 100 | 1 |
FIG. 14D

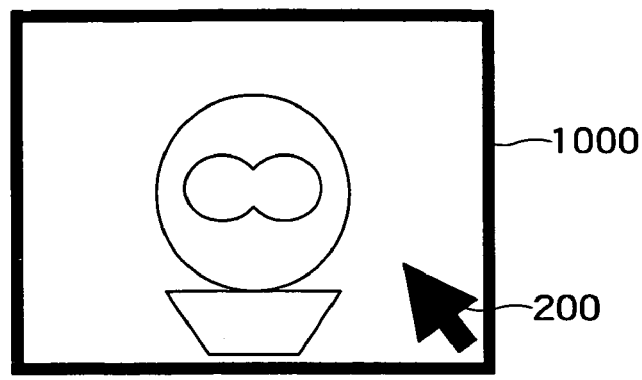
FIG. 15A
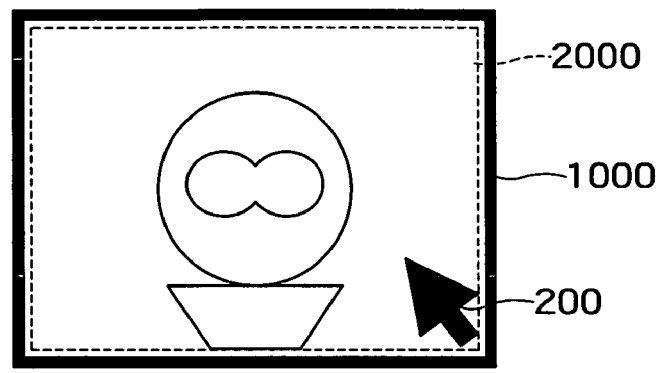
FIG. 15B
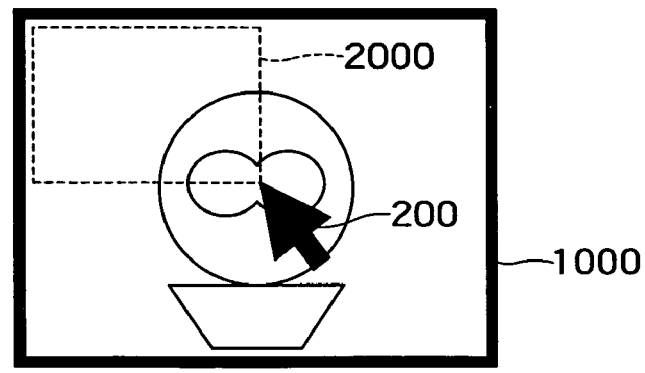
FIG. 15C
| ID | x | y | w | h | Layer |
|---|---|---|---|---|---|
| 1 | 0 | 0 | 50 | 50 | 1 |
FIG. 15D

| ID | x | y | w | h | Layer |
|---|---|---|---|---|---|
| 1 | 0 | 0 | 50 | 50 | 1 |

| ID | x | y | w | h | Layer | x1 | y1 |
|---|---|---|---|---|---|---|---|
| 1 | 0 | 0 | 100 | 100 | 1 | 15 | 20 |

FIG. 17A

| ID | x | y | w | h | Layer | x1 | y1 |
|---|---|---|---|---|---|---|---|
| 1 | 25 | 25 | 50 | 50 | 1 | 15 | 20 |

FIG. 17B

| ID | x | y | w | h | Layer | x1 | y1 |
|---|---|---|---|---|---|---|---|
| 1 | 15 | 20 | 50 | 50 | 1 | 15 | 20 |

FIG. 17C

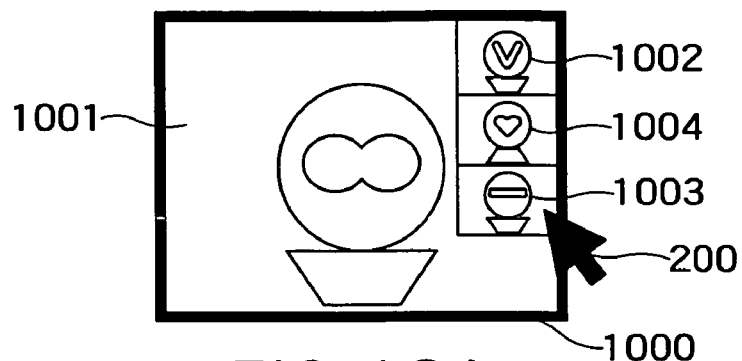
FIG. 18A
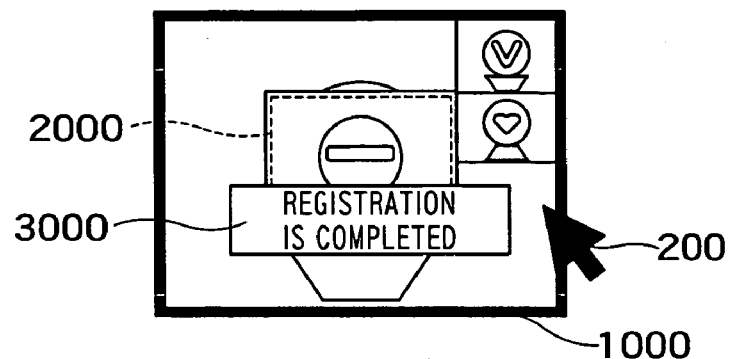
FIG. 18B
| 1 | 25 | 25 | 50 | 50 | 1 | 90 | 70 |
FIG. 18C
| ID | x | y | w | h | Layer |
|---|---|---|---|---|---|
| 1 | 25 | 25 | 50 | 50 | 1 |
FIG. 18D

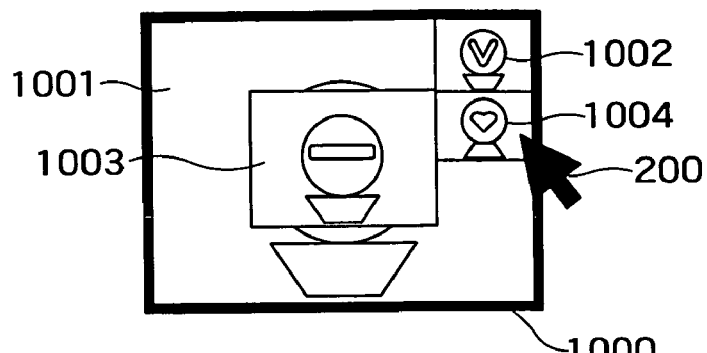
FIG. 20A
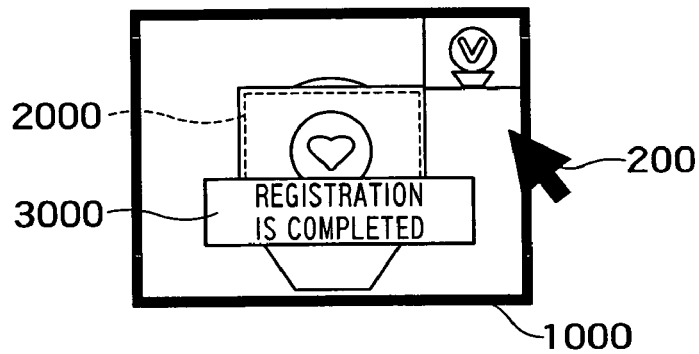
FIG. 20B
| 2 | 25 | 25 | 50 | 50 | 1 | 90 | 45 |
FIG. 20C
| ID | x | y | w | h | Layer |
|---|---|---|---|---|---|
| 1 | 25 | 25 | 50 | 50 | 2 |
| 2 | 25 | 25 | 50 | 50 | 1 |
FIG. 20D

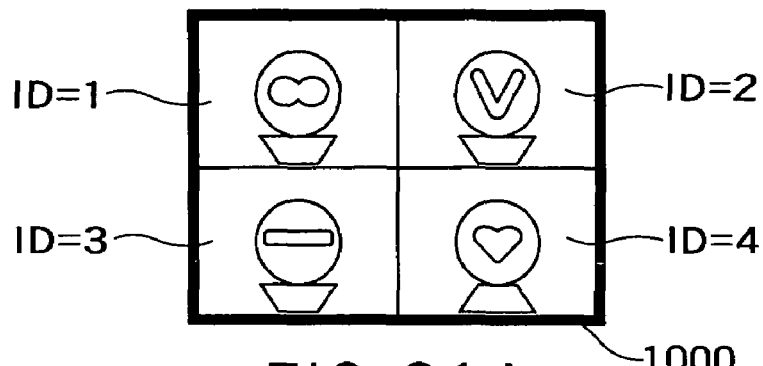
FIG. 21A
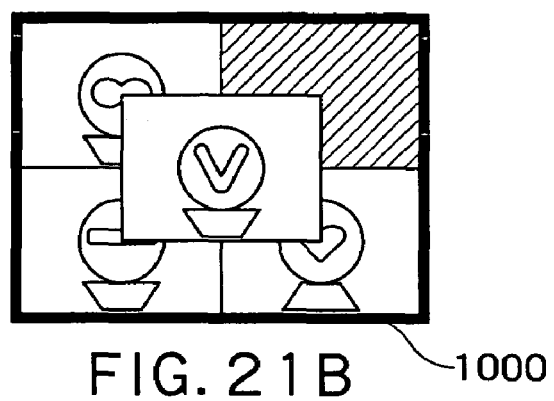
FIG. 21B
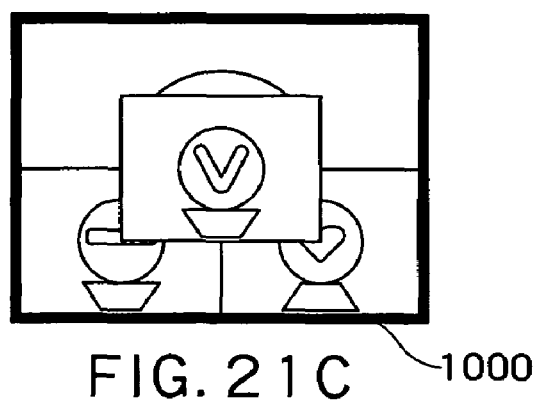
FIG. 21C
| 2 | 25 | 25 | 50 | 50 | 1 |
FIG. 22A
| 1 | 0 | 0 | 100 | 100 | 4 |
FIG. 22B

| ID | x | y | w | h | Layer |
|---|---|---|---|---|---|
| 1 | 0 | 0 | 50 | 50 | 1 |
| 2 | 0 | 50 | 50 | 50 | 2 |
| 3 | 50 | 0 | 50 | 50 | 3 |
| 4 | 50 | 50 | 50 | 50 | 4 |

FIG. 23A

| ID | x | y | w | h | Layer |
|---|---|---|---|---|---|
| 1 | 0 | 0 | 50 | 50 | 2 |
| 2 | 25 | 25 | 50 | 50 | 1 |
| 3 | 50 | 0 | 50 | 50 | 3 |
| 4 | 50 | 50 | 50 | 50 | 4 |

FIG. 23B

| ID | x | y | w | h | Layer |
|---|---|---|---|---|---|
| 1 | 0 | 0 | 100 | 100 | 4 |
| 2 | 25 | 25 | 50 | 50 | 1 |
| 3 | 50 | 0 | 50 | 50 | 2 |
| 4 | 50 | 50 | 50 | 50 | 3 |

FIG. 23C

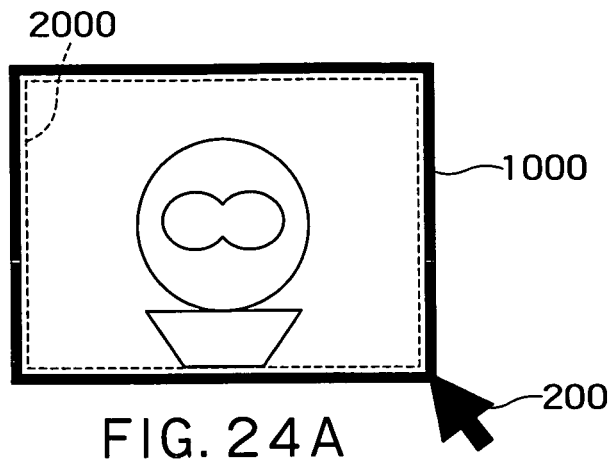
FIG. 24A
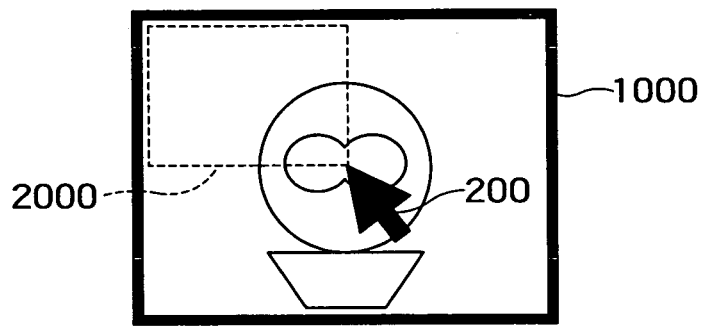
FIG. 24B
| 1 | 0 | 0 | 90 | 90 | 1 |
FIG. 24C
| 1 | 0 | 0 | 80 | 80 | 1 |
FIG. 24D
| 1 | 0 | 0 | 70 | 70 | 1 |
FIG. 24E
| 1 | 0 | 0 | 60 | 60 | 1 |
FIG. 24F
| 1 | 0 | 0 | 50 | 50 | 1 |
FIG. 24G

| ID | n | x | y | w | h | Layer |
|---|---|---|---|---|---|---|
| 31 | 2 | 0 | 0 | 50 | 50 | 1 |
| 32 | 2 | 50 | 0 | 50 | 50 | 2 |
| 33 | 2 | 0 | 50 | 50 | 50 | 3 |
| 34 | 2 | 50 | 50 | 50 | 50 | 4 |

| 1 | 0 | 0 | 50 | 50 | 1 | 25 | 25 |

| ID | x | y | w | h | Layer |
|---|---|---|---|---|---|
| 1 | 0 | 0 | 50 | 50 | 1 |

| 1 | 12.5 | 12.5 | 50 | 50 | 1 | 37.5 | 37.5 |

| ID | x | y | w | h | Layer |
|---|---|---|---|---|---|
| 1 | 12.5 | 12.5 | 50 | 50 | 1 |

| ID | x | y | w | h | Layer |
|----|----|----|----|----|-------|
| 1 | 0 | 0 | 33 | 33 | 1 |
| 2 | 33 | 0 | 33 | 33 | 2 |
| 3 | 66 | 0 | 33 | 33 | 3 |
| 4 | 0 | 33 | 33 | 33 | 4 |
| 5 | 66 | 33 | 33 | 33 | 5 |
| 6 | 0 | 66 | 33 | 33 | 6 |
| 7 | 33 | 66 | 33 | 33 | 7 |
| 8 | 66 | 66 | 33 | 33 | 8 |

FIG. 38

| 1 | 0 | 0 | 33 | 33 | 1 |
|---|---|---|----|----|---|
| 2 | 33 | 0 | 33 | 33 | 2 |
| 3 | 66 | 0 | 33 | 33 | 3 |
| 4 | 0 | 33 | 33 | 33 | 4 |
| 5 | 66 | 33 | 33 | 33 | 5 |
| 6 | 0 | 66 | 33 | 33 | 6 |
| 7 | 33 | 66 | 33 | 33 | 7 |
| 8 | 66 | 66 | 33 | 33 | 8 |

FIG. 39

| ID | x | y | w | h | Layer |
|---|---|---|---|---|---|
| 1 | 0 | 0 | 33 | 33 | 2 |
| 2 | 33 | 0 | 33 | 33 | 3 |
| 3 | 66 | 0 | 10 | 10 | 1 |
| 4 | 0 | 33 | 33 | 33 | 4 |
| 5 | 66 | 33 | 33 | 33 | 5 |
| 6 | 0 | 66 | 33 | 33 | 6 |
| 7 | 33 | 66 | 33 | 33 | 7 |
| 8 | 66 | 66 | 33 | 33 | 8 |

FIG. 41

| ID | n | x | y | w | h | Layer |
|---|---|---|---|---|---|---|
| 31 | 3 | 0 | 0 | 33 | 33 | 1 |
| 32 | 3 | 33 | 0 | 33 | 33 | 2 |
| 33 | 3 | 66 | 0 | 33 | 33 | 3 |
| 34 | 3 | 0 | 33 | 33 | 33 | 4 |
| 35 | 3 | 66 | 33 | 33 | 33 | 5 |
| 36 | 3 | 0 | 66 | 33 | 33 | 6 |
| 37 | 3 | 33 | 66 | 33 | 33 | 7 |
| 38 | 3 | 66 | 66 | 33 | 33 | 8 |

FIG. 42

VIDEO DISPLAY APPARATUS, VIDEO COMPOSITION DELIVERY APPARATUS, AND SYSTEM

CROSS-REFERENCE TO RELATED APPLICATIONS

This application claims the benefit of priority under 35USC §119 to Japanese Patent Application No. 2005-15929 filed on Jan. 24, 2005, the entire contents of which are incorporated herein by reference.

BACKGROUND OF THE INVENTION

1. Field of the Invention

The present invention relates to a technique for controlling a video image composition processing in a video composition delivery apparatus from a video display apparatus, the video composition delivery apparatus and the video display apparatus being connected to a network. The present invention is used in, for example, a multipoint video conference system utilizing an image composition (video composition) server.

2. Related Art

It is possible to construct a multipoint video conference system using exchange of video images and voices between information devices capable of transmitting and receiving data via the network.

When constructing a multipoint video conference system including a plurality of conference terminals, there are a method of mutually exchanging video images between conference terminals, and a method of utilizing a conference server, transmitting video images from conference terminals to the conference server, composing video images received from a plurality of conference terminals to form one video image in the conference server, and then delivering the resultant video image to the terminals. Especially in the latter method, it suffices to receive a video image from the single conference server, and consequently the network load can be reduced as compared with the former method. The conference using the former method and the conference using the latter method are sometimes called distributive multipoint conference and concentrated multipoint conference, respectively.

The conference server is sometimes called MCU (Multipoint Control Unit) as well.

Video images received from respective terminals are respectively referred to as video sources. As for positions in which respective video sources are arranged in a composite video image, there are a method in which the conference server automatically determines and a method in which respective terminals exercise control. For example, in the case where the number of video sources is four, there are various composition patterns as to the arrangement position of the video sources, such as the case where the composite image is created so as to be divided into four parts, and the case where with respect to one video image remaining three video images are arranged like pictures in picture. In the case where control is exercised from each terminal, there is a method in which one is selected from among predetermined patterns and a notice thereof is sent to the conference server to change a composite video image. Besides the method of changing the video layout by ordering a pattern, a method of specifying arrangement positions of video sources from the terminal side is also conceivable.

On the other hand, unlike the multipoint video conference system, a system which receives screen information from a remote device and sends a control signal for updating screen information to the remote device is utilized in remote control of a personal computer (PC) as well.

For example, as a method for operating a remote PC, a concept "remote desktop" is proposed. This remote desktop function is mounted on PCs having Windows XP, which is the OS of the Microsoft Corporation, by default. According to the "remote desktop," it becomes possible to operate a remote PC connected via a network as if it is at hand, by transmitting operation information such as mouse click generated by a device at hand to a remote device, creating screen information of a result obtained by conducting processing in the remote device which has received the operation information, and transmitting the screen information to the device at hand. When transmitting the screen information, a manner for lowering the network load is made by using transmission of only screen difference information, compression of transmitted image information, or the like.

Furthermore, in the "remote desktop" described above, screen information, i.e., image data itself is transmitted from the remote device which constructs screen information to the device at hand. However, a method of transmitting only a drawing instruction and conducting display processing in the device which has received the drawing instruction on the basis of the drawing instruction is proposed (Japanese Patent Application Laid-Open Publication No. 8-297617). As a concept of the same kind, there is a method called VNC (Virtual Networks Computing) and implemented.

In the ensuing description of the multipoint video conference system using a conference server and transmitting one composite video image from the conference server to a terminal, a conference server serving as an apparatus which provides a composite video image is referred to simply as "server" and a terminal serving as an apparatus which receives and displays the composite video image is referred to as "client." Furthermore, in the remote desktop as well, an apparatus which creates and provides a screen and which is typically called terminal is referred to as "server", and an apparatus which displays a screen and which is called viewer is referred to as "client." The video image or view transmitted from the server to the client is a moving picture (such as MPEG4, MPEG2, H.263, H.264) or a still picture (such as continuous transmission of motion JPEG, JPEG image, and transmission of only difference information changed in a still picture). In the ensuing description, however, the video image or screen transmitted from the server to the client is referred to simply as "composite video image."

For example, it is supposed in the multipoint video conference system that the server composites video images of participants B, C, D and E received respectively from terminals B, C, D and E into one video image, and transmits a resultant composite video image to a client which is a terminal A. In this case, the client itself does not recognize the four video images individually. Only the server recognizes the four video images individually.

On the other hand, for example, on the remote desktop in a PC having the Windows XP mounted thereon, a window or the like is displayed on a composite video image received by the client. A user who operates the client can freely move the window in a display screen of the client and change the size of the window. If the window is started by a drawing application and, for example, a rectangular figure is drawn in the window, it is also possible to move the position of the rectangular figure and change the size of the rectangular figure. If the window or the rectangular figure is clicked by a mouse, it is changed to a display which indicates that it has been selected. By further conducting mouse operation on the changed figure, it becomes possible to change the position and size. In these operations, however, the client does not recognize the window and the rectangular figure itself, but the server recognizes the window and rectangular figure. As for the display change of the window and the rectangular figure as well, only the position information of the mouse is conveyed to the server at the time of mouse click. The server judges the processing of the mouse operation, and creates a composite video image with the window and the rectangular figure changed. The client merely displays the composite video image received from the server.

In the client having a function of receiving a composite video image created by the server and merely displaying the composite image, the composite video image is nothing but one video image. It is not clear that the composite video image includes a plurality of video sources, and boundaries between video sources are not clear, either.

In the above-described pattern changeover method used in the multipoint video conference system, detailed layout information representing portions in the composite video image in which objects are arranged is not managed. On the other hand, in Japanese Patent Application Laid-Open Publication Nos. 5-103324 and 9-149396, a concept that the composite image is changed by transmitting object layout information to the server is shown. Accordingly, it is imagined that the client manages the object layout information. In Japanese Patent Application Laid-Open Publication Nos. 5-103324 and 9-149396, however, only the configuration of the server is shown, and how the client knows the object layout information is not described at all. As the method for knowing the object layout information, for example, a method of sending a notice of object layout information from the server is also conceivable. However, a mechanism in which bidirectional information can be exchanged between the client and the server becomes necessary for control signals. By the way, as for a change of the composite image in the server, there is a possibility that the composite image is automatically changed because of an increase or decrease in conference participants. Therefore, a mechanism for sending a notice from the server to the client each time a change is conducted or a mechanism for the client to ascertain the change as occasion demands is necessary. In addition, it is necessary to consider processing to be conducted when timing for transmitting a control signal from the client and timing for sending a notice of layout information from the server overlap each other, resulting in complicated processing.

SUMMARY OF THE INVENTION

According to an aspect of the present invention, there is provided with a video display apparatus comprising: a receiving unit configured to receive a composite video image generated from a plurality of video sources; a display unit configured to display the received composite video image; an area manager configured to store area information pieces; a position specification unit configured to specify a position on the composite video image displayed by the display unit; an area selection unit configured to select an area information piece from the area information pieces stored in the area manager; an area display unit configured to provide information indicating the area represented by the area information piece selected by the area selection unit to the display unit so as to superpose the information on the displayed composite video image; an area change unit configured to change the information; an area information update unit configured to update the area information piece selected by the area selection unit stored in the area manager according to the information obtained after the change; and a control signal transmission unit configured to generate an update control signal containing the area information piece after update, and transmit the update control signal to a generation source of the composite video image.

According to an aspect of the present invention, there is provided with a video composition delivery apparatus, comprising: a video source receiving unit configured to receive video sources of a composite video image; a layout information manager configured to manage layout information pieces including an identifier identifying the video source, the layout information piece indicating the layout of an image represented by the video source on the composite video image; a composite video generation unit configured to generate the composite video image from the video sources received by the video source receiving unit, by using the layout information pieces; a transmitting unit configured to transmit the generated composite video image to a destination device; a control signal receiving unit configured to receive an update control signal from the destination device, the update control signal containing an area information piece indicating an area on the composite video image; a video manager configured to manage a corresponding relation between the identifier of a video source and a further identifier identifying the area information piece contained in the update control signal; and a layout information update unit configured to update the layout information piece of a video source associated with the further identifier according to the area information piece contained in the update control signal.

According to an aspect of the present invention, there is provided with a video delivery system comprising a video composition delivery apparatus configured to generate a composite video image from video sources and a video display apparatus configured to receive the composition video image from the video composition delivery apparatus to display the received composition video image: the video display apparatus including: a receiving unit configured to receive the composite video image from the video composition delivery apparatus, a display unit configured to display the received composite video image, an area manager configured to store area information pieces, a position specification unit configured to specify a position on the composite video image displayed by the display unit, an area selection unit configured to select an area information piece indicating an area including the position specified by the position specification unit from the area information pieces stored in the area manager, an area display unit configured to provide information indicating the area represented by the area information piece selected by the area selection unit to the display unit so as to superpose the information on the displayed composite video image, an area change unit configured to change the information provided by the area display unit, an area information update unit configured to update the area information piece selected by the area selection unit according to the information obtained after the change, and a control signal transmission unit configured to generate an update control signal containing the area information piece after update and an first identifier identifying the area information piece after update, and configured to transmit the update control signal to the video composition delivery apparatus, the video composition delivery apparatus including: a video source receiving unit configured to receive video sources, a layout information manager configured to manage layout information pieces including an second identifier identifying the video source, the layout information piece indicating the layout of an image represented by the video source on the composite video image, a composite video generation unit configured to generate the composite video image from the video sources received by the video source receiving unit, by using the layout information pieces, a transmitting unit configured to transmit the generated composite video image to the video display apparatus, a control signal receiving unit configured to receive the update control signal from the video display apparatus, a video manager configured to manage a corresponding relation between the second identifier of a video source and the first identifier, and a layout information update unit configured to update the layout information piece of a video source associated with the first according to the area information piece contained in the update control signal.

BRIEF DESCRIPTION OF THE DRAWINGS

FIGS. 7A and 7B are a diagram showing a first entry example in an area management table according to a first embodiment of the present invention;

FIGS. 8A and 8B are a diagram showing a second entry example in an area management table according to a first embodiment of the present invention;

FIG. 12 is a diagram showing a payload portion of a rectangle registration packet according to a first embodiment of the present invention;

FIG. 13 is a diagram showing a payload portion of a rectangular area packet according to a first embodiment of the present invention;

FIGS. 14A to 14D are a diagram showing a first example of how a composite video control instruction generator functions according to a first embodiment of the present invention;

FIGS. 15A to 15D are a diagram showing a second example of how a composite video control instruction generator functions according to a first embodiment of the present invention;

FIGS. 17A to 17C are a diagram showing a third example of how a composite video control instruction generator functions according to a first embodiment of the present invention;

FIGS. 18A to 18D are a diagram showing a fourth example of how a composite video control instruction generator functions according to a first embodiment of the present invention;

FIGS. 20A to 20D are a diagram showing a sixth example of how a composite video control instruction generator functions according to a first embodiment of the present invention;

FIGS. 21A to 21C are a first diagram showing a seventh example of how a composite video control instruction generator functions according to a first embodiment of the present invention;

FIGS. 22A and 22B are a second diagram showing a seventh example of how a composite video control instruction generator functions according to a first embodiment of the present invention;

FIGS. 23A to 23C are a third diagram showing a seventh example of how a composite video control instruction generator functions according to a first embodiment of the present invention;

FIGS. 24A to 24G are a diagram showing an eighth example of how a composite video control instruction generator functions according to a first embodiment of the present invention;

FIG. 38 is a diagram showing an initial state of an area management table according to a fourth embodiment of the present invention;

FIG. 39 is a diagram showing a payload portion of a composite video control packet according to a fourth embodiment of the present invention;

FIG. 41 is a diagram showing a change state of an area management table according to a fourth embodiment of the present invention; and FIG. 42 is a diagram showing an example of a layout information management table according to a fourth embodiment of the present invention.

DESCRIPTION OF THE EMBODIMENTS

In order to facilitate understanding embodiments of the present invention, the multipoint video conference system utilizing a conference server known by the present inventors before making the present invention will be described briefly. Embodiments of the present invention are premised on use of a conference server. Hereafter, therefore, the multipoint video conference system utilizing a conference server will be referred to simply as multipoint video conference system.

Figure 1:
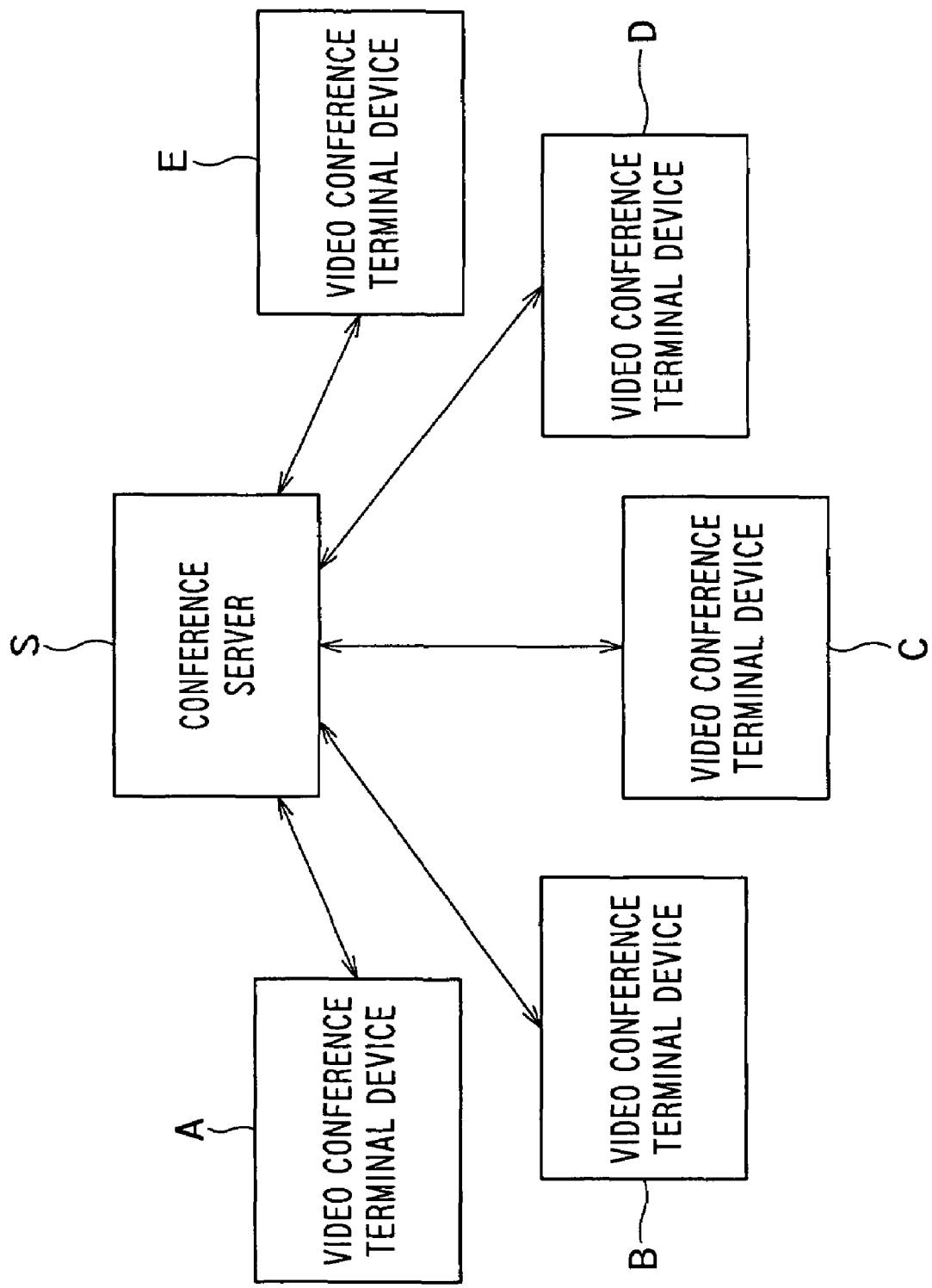
FIG. 1 is a schematic diagram showing a configuration of a typical multipoint video conference system.

FIG. 1 is a schematic diagram of a multipoint video conference system. A conference server S is connected simultaneously to a plurality of video conference terminal devices. The conference server S has a function of composing video images received from respective conference terminals into one video image and transmitting a resultant composite image to respective conference terminals. In FIG. 1, the conference server S is connected to five video conference terminal devices A, B, C, D and E.

Figure 2:
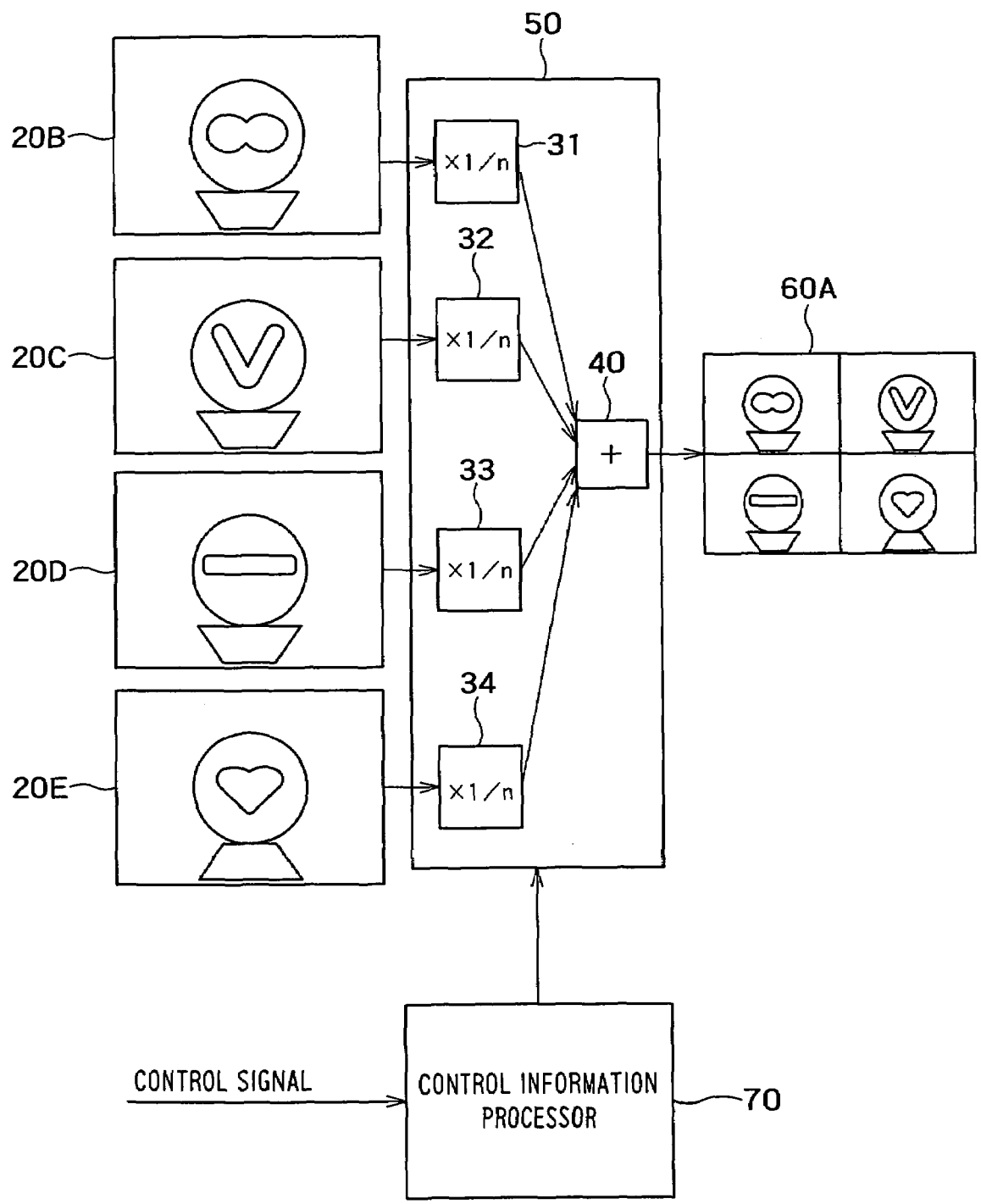
FIG. 2 is a block diagram showing a configuration of a conference server known by the present inventors before making the present invention.

FIG. 2 is a diagram showing a part of a configuration of the conference server S. In FIG. 2, a video composition processor 50 has a function of creating one composite video data by utilizing video data received from multi-points. A control information processor 70 has a function of analyzing a control signal received from a video conference terminal device, and inputting a control signal, which specifies arrangement of video data received from multi-points in a composite image on the basis of a result of the analysis, to the video composition processor 50. As for the internal configuration of the video composition processor 50 shown in FIG. 2, there are several configuration examples. As an example thereof, the case where the video composition processor 50 includes size change circuits 31, 32, 33 and 34 which convert the sizes of respective video images, and a composition circuit 40 which composites video images subjected to the size conversion is shown. By the way, the conference server in every multipoint video conference system does not always include the control information processor 70. However, it is supposed that the conference server S for which embodiments of the present invention are intended includes the control information processor 70 as a component.

In a situation in which the multipoint video conference system shown in FIG. 1 operates, video data 20B, 20C, 20D and 20E received from the video conference terminal devices B, C, D and E are input to the video composition processor 50. The video composition processor 50 creates a composite video image 60A by halving aspect ratios of respective video images and arranging resultant video images in upper right-hand, upper left-hand, lower right-hand and lower left-hand quadrants so as not to cause overlapping. The video composition processor 50 outputs the composite video image 60A for transmission to the video conference terminal device A.

For example, specification signals which specify scaling factors and display positions to be displayed on terminal devices are input from respective video terminal devices to the control information processor 70. The control information processor 70 analyzes the specification signals, creates a control signal for the video composition processor 50, and outputs the control signal to the video composition processor 50.

Hereafter, embodiments of the present invention will be described in more detail with reference to the drawings.

First Embodiment

Hereafter, a first embodiment of the present invention will be described with reference to FIGS. 3 to 26.

Figure 3:
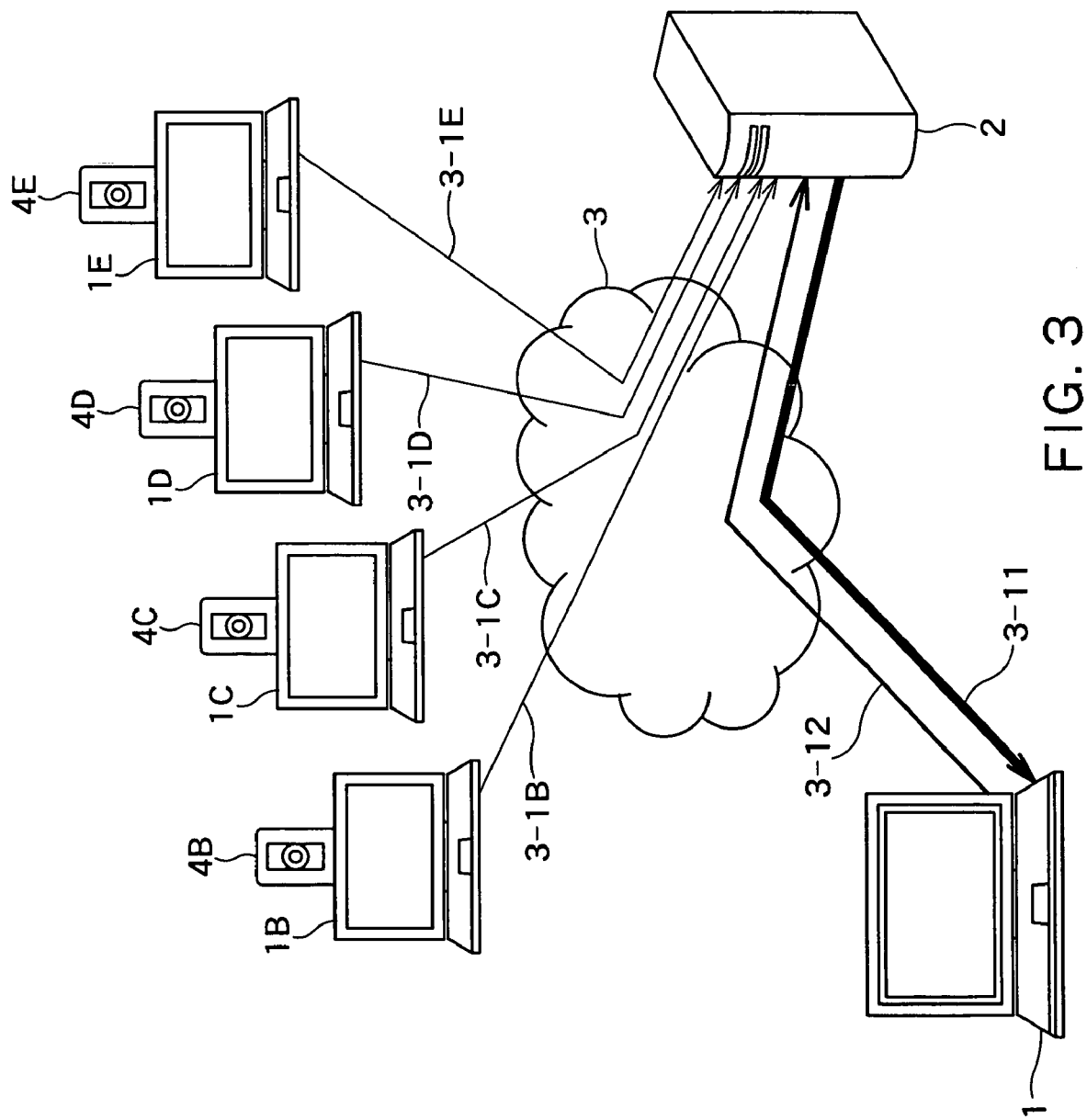
FIG. 3 is a system configuration diagram of a multipoint video conference system according to a first embodiment of the present invention.

FIG. 3 shows a system configuration of a multipoint video conference system according to the present invention. FIG. 3 shows an example of the case where video conference is conducted at five points in the multipoint video conference system. The multipoint video conference system includes video conference terminal devices 1, 1B, 1C, 1D and 1E and a conference server 2. The video conference terminal devices 1, 1B, 1C, 1D and 1E are connected to the conference server 2 via a network 3.

In the present embodiment, the video conference terminal devices 1B, 1C, 1D and 1E have a function of transmitting video data to the conference server 2 by utilizing communication paths 3-1B, 3-1C, 3-1D and 3-1E, respectively. The conference server 2 has a function of composing video images received from the video conference terminal devices 1B, 1C, 1D and 1E into one video image in a state in which the conference server 2 is connected simultaneously to the video conference terminal devices 1, 1B, 1C, 1D and 1E, and transmitting a resultant composite video image to the video conference terminal device 1. The video data transmitted by the video conference terminal devices 1B, 1C, 1D and 1E may be video data created utilizing respective camera devices 4B, 4C, 4D and 4E, or video data stored in respective video conference terminal devices. On the other hand, the video conference terminal device 1 has a function of receiving video data transmitted by the conference server 2 by utilizing a communication path 3-11 between it and the conference server 2 and transmitting a control signal to the conference server 2 by utilizing a communication path 3-12. By the way, the video conference terminal device 1 may have a function of transmitting video data to the conference server 2 in the same way as the video conference terminal devices 1B, 1C, 1D and 1E. The video conference terminal devices 1B, 1C, 1D and 1E may have a function of receiving video data from the conference server 2 in the same way as the video conference terminal device 1. Since only video data is described in the present embodiment, description concerning transmission and reception of voice data which are originally an indispensable function of the multipoint video conference system will be omitted.

The video conference terminal devices 1, 1B, 1C, 1D and 1E are, for example, personal computers (hereafter referred to as PCs) or PDAs (Personal Digital Assistants) having a function of conducting communication via the network. The video conference terminal devices 1, 1B, 1C, 1D and 1E have a function of displaying video data received from the conference server 2. The present embodiment will now be described supposing that the video conference terminal device 1 is a PC of notebook type having a Windows OS of the Microsoft Corporation mounted thereon.

Figure 4:
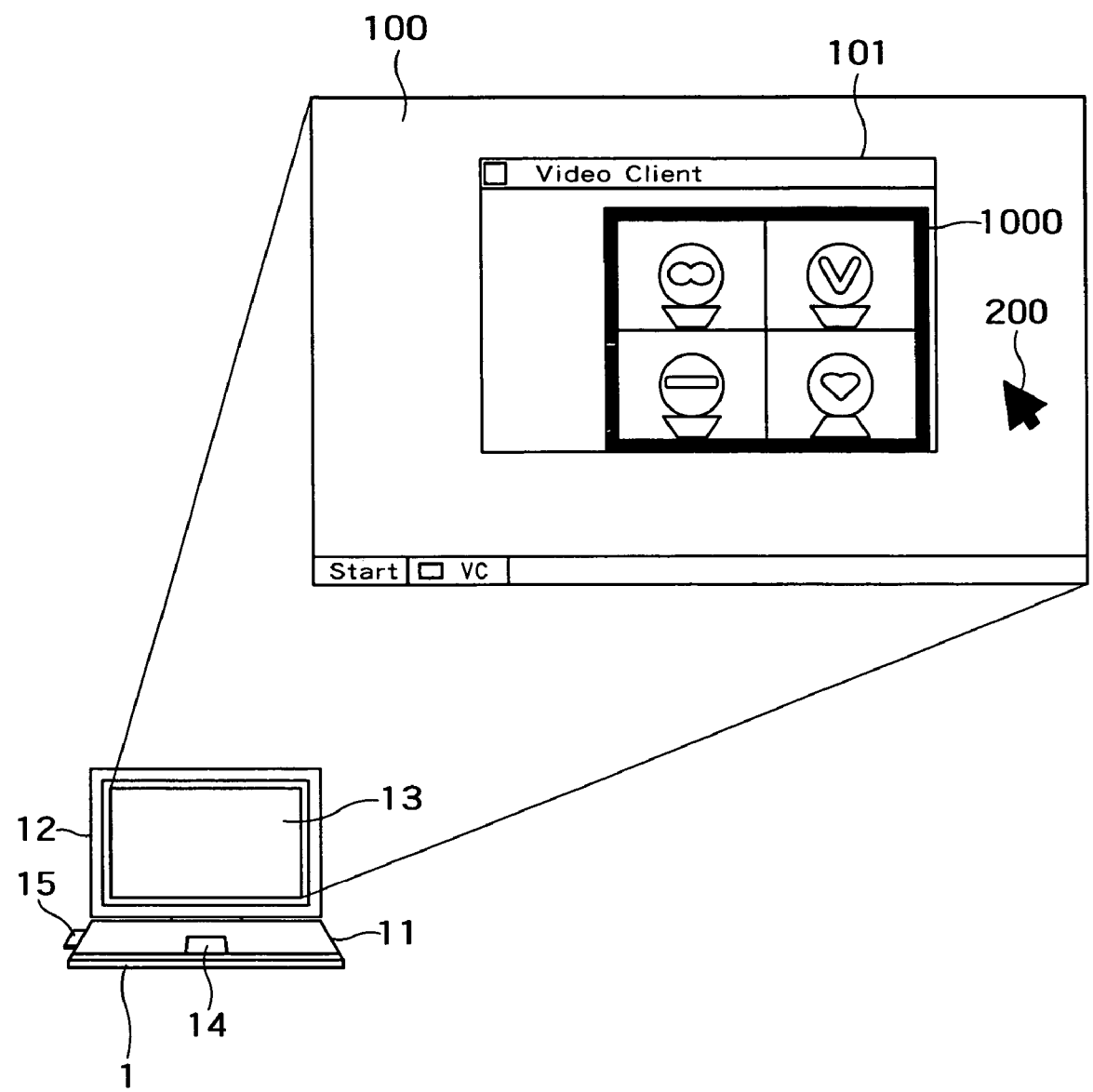
FIG. 4 is an exterior view of a video conference terminal device according to a first embodiment of the present invention.

FIG. 4 is an exterior oblique view with a display unit of the video conference terminal device 1 opened. The video conference terminal device 1 includes a computer main body 11 and a display unit 12. An LCD (Liquid Crystal Display) 13 forming a display panel is incorporated into the display unit 12. The LCD 13 is located substantially in the center of the display unit 12.

A desktop screen 100 is displayed on a screen display unit of the display unit 12 (on a display screen of the LCD 13). A window 101 and a pointer 200 of an application having a function of displaying video data received from the conference server 2 in a display area 1000 are displayed on the desktop screen (hereafter referred to simply as display screen) 100. By the way, since the display function of the window 101 and the display function and operation function of the pointer 200 are already mounted on ordinary PCs, description of them will be omitted.

The computer main body 11 has a thin box-shaped chassis. On a top surface of the computer main body 11, a pointing device 14 is disposed to conduct operation concerning the pointer 200. This pointing device 14 corresponds, for example, a position specification unit, an area change unit and an area specification unit. In addition, a network communication device 15 is incorporated in the computer main body 11. By the way, the pointing device 14 is disposed on the computer main body 11; however, for example, in a PC utilizing an external mouse, the mouse corresponds to the pointing device 14. The network communication device 15 is a device which executes network communication. The network communication device 15 includes, for example, a physical connector for connection to a network. The network communication device 15 executes data transfer according to a command input from a CPU in the computer main body 11. Its control is conducted according to a communication protocol stored in a memory in the computer main body 11.

Figure 5:
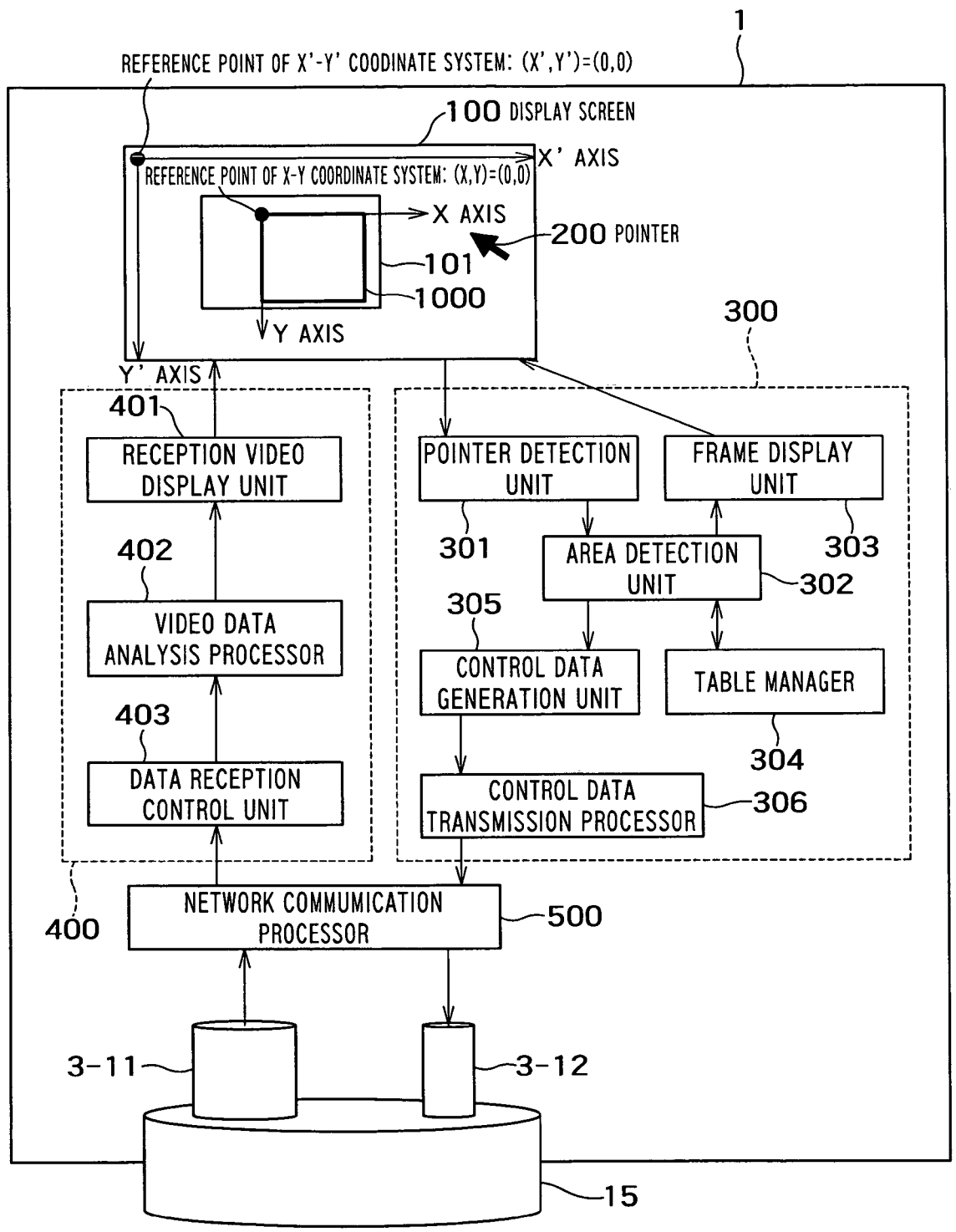
FIG. 5 is a block diagram showing a configuration of a video conference terminal device according to a first embodiment of the present invention.
Figure 6A:
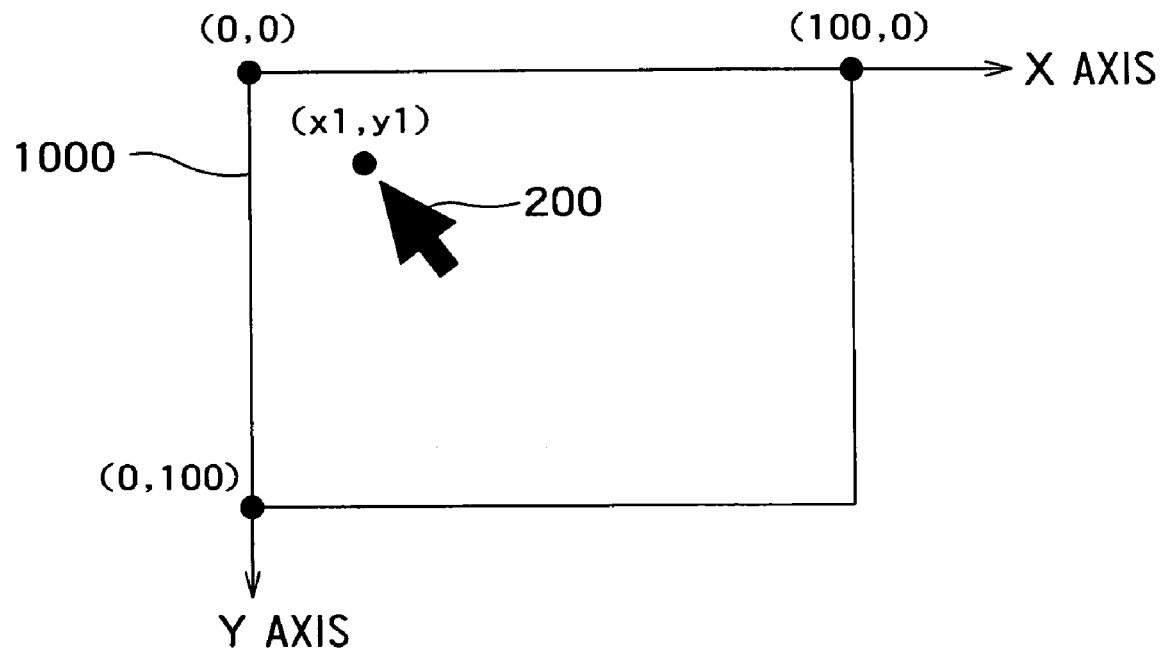
FIGS. 6A and 6B are a diagram showing coordinate axes of a display area in a video conference terminal device according to a first embodiment of the present invention.
Figure 6B:
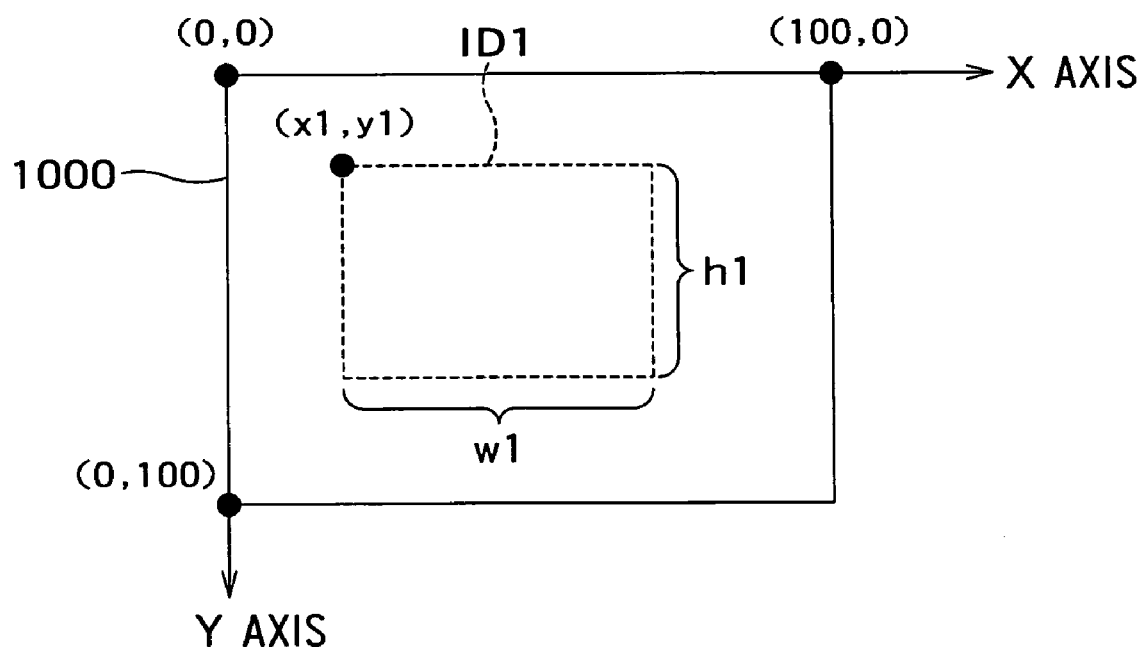

FIG. 5 shows internal components according to the present invention in the video conference terminal device 1 shown in FIG. 4. In FIG. 4 and FIG. 5, expression of components (such as the CPU) that do not exert direct influence in implementing function improvements according to the present invention is omitted. Functions represented by the configuration shown in FIG. 5 may be implemented by causing the computer to execute a program generated using an ordinary programming technique or implemented in a hardware manner.

The video conference terminal device 1 includes a conference video display processor 400, and a composite video control instruction generator 300, which forms one great feature of the present embodiment, as its components. The video conference terminal device 1 is supposed to be a PC. The conference video display processor 400 and the composite video control instruction generator 300 can display drawing data created in them on the display screen 100 shown in FIG. 4 by utilizing a drawing function mounted on the PC. Furthermore, the conference video display processor 400 can receive video data via the communication path 3-11 shown in FIG. 3 by utilizing a function of a network communication processor 500. On the other hand, the composite video control instruction generator 300 can transmit control data via the communication path 3-12 shown in FIG. 3 by utilizing a function of a network communication processor 500.

The conference video display processor 400 includes a reception video display unit 401, a video data analysis processor 402, and a data reception control unit 403. The data reception control unit 403 acquires received data from the network communication processor 500, constructs encoded video data from data received via the network, and outputs the constructed encoded video data to the video data analysis processor 402. The video data analysis processor 402 constructs decoded video data that can be displayed, by decoding the input encoded video data, and outputs the decoded video data to the reception video display unit 401. The reception video display unit 401 has a function of creating and displaying the window 101 serving as the application. If video data that can be displayed is input, the reception video display unit 401 displays the video data as "video image" in the display area 1000 in the window 101.

The network communication processor 500 can conduct video data transfer by utilizing the communication path 3-11. The network communication processor 500 supports, for example, UDP/IP, RTP or the like as a communication protocol. The conference video display processor 400 can receive video data received from the conference server 2, via the network communication processor 500.

On the other hand, the composite video control instruction generator 300 which forms a feature of the present embodiment includes a pointer detection unit 301, an area detection unit 302, a frame display unit 303, a table manager 304, a control data generation unit 305 and a control data transmission processor 306. The table manager 304 corresponds, for example, an area manager and an area information update unit. The frame display unit 303 corresponds, for example, an area display unit. The area detection unit 302 corresponds, for example, a predetermined area selection unit.

The pointer detection unit 301 detects that the pointer 200 is on the display area 1000 in the window 101 on the display screen 100. If an operation event has occurred in that position, the pointer detection unit 301 detects the event. The operation event is generated by click caused by mouse operation, double-click, drag and drop, or the like. As shown in FIG. 5, the pointer detection unit 301 can manage the position of the pointer 200 and the position of the window 101 on the display screen 100 by managing the display screen 100 utilizing X'-Y' coordinates. Upon detecting that an operation event has occurred on the display area 1000, the pointer detection unit 301 outputs position information of the pointer 200 (represented utilizing X'-Y' coordinates) and operation event information (such as ON of the left click, OFF of the left click, and ON of the right click) to the area detection unit 302.

As shown in FIG. 5, the area detection unit 302 manages the display area 1000 in the window 101 by using X-Y coordinates, transforms the position information of the pointer 200 (represented utilizing the X'-Y' coordinates) input from the pointer detection unit 301 to X-Y coordinates, and temporarily stores values obtained by the transformation, as position information of the pointer 200. Furthermore, the area detection unit 302 temporarily stores the operation event information input from the pointer detection unit 301, so as to associate it with the position information of the pointer 200. In the case of an operation event that has no relation to the operation of the area detection unit 302 itself, the area detection unit 302 discards the position information of the pointer 200 and the operation event without temporarily storing them. For example, if only ON of the left click and OFF of the left click are valid as operation events, the area detection unit 302 temporarily stores only the position information and the operation event so as to associate them with the position information of the pointer 200 only when ON of the left click and OFF of the left click is performed. The relation between X-Y coordinates managed by the area detection unit 302 and the display area 1000 will now be described with reference to FIG. 6. Representing a point in X-Y coordinates as (x, y), the area detection unit 302 manages, for example, an upper left-hand vertex of the display area 1000 as (0, 0), an upper right-hand vertex as (100, 0), a lower left-hand vertex as (0, 100), and a lower right-hand vertex as (100, 100). In other words, the area detection unit 302 manages positions on the display area 1000 by normalizing the horizontal direction and the vertical direction of the display area 1000 to the value of 100. For example, if ON of the left click has occurred in a position (x1, y1) shown in FIG. 6A, the area detection unit 302 temporarily stores information {x1, y1, event A}. Here, the event A indicates that the ON operation of the left click has been conducted. As internal processing, the information {x1, y1, event A} is defined as a "position ascertainment" signal. After the area detection unit 302 has temporarily stored the position ascertainment signal {x1, y1, event A}, the area detection unit 302 outputs the position ascertainment signal {x1, y1, event A} to the table manager 304. If an associated result is input from the table manager 304 after the position ascertainment signal {x1, y1, event A} is output to the table manager 304, the area detection unit 302 creates control signals for the frame display unit 303 and the control data generation unit 305 on the basis of the result, and outputs the control signals to them. Operation conducted after the area detection unit 302 has output the position ascertainment signal {x1, y1, event A} to the table manager 304 will be described again after description of the function of the table manager 304.

The table manager 304 creates and retains an area management table shown in FIG. 7 therein. FIG. 7A shows the area management table at the time of initialization. Values are not described at all. As items, however, an ID number, parameters x, y, w and h indicating a rectangular area in X-Y coordinates, and layer can be described. The ID number is a number for identifying a rectangular area. Taking a rectangular area shown in FIG. 6B as an example, x, y, w and h become x=x1, y=y1, w=w1 and h=h1. The layer is used to represent a layer position of each rectangular area when managing a plurality of rectangular areas in the area management table. For example, if a rectangular area is located on a kth layer, it follows that layer=k. By the way, a rectangular area on the kth layer assumes a higher rank than a rectangular area on a (k+1)th layer. FIG. 7B indicates a state in which k rectangular areas ID1 to IDk have been registered. If the position ascertainment signal {x1, y1, event A} is input from the area detection unit 302, the table manager 304 recognizes it as a "position ascertainment" signal and ascertains registered information in the area management table. If the position information (x1, y1) indicates a point that does not belong to any rectangular area managed by the area management table, then the table management table outputs information "unregistered" to the area detection unit 302. And the table management table outputs an ID number that is unused in the area management table to the area detection unit 302 as a parameter for the information "unregistered." On the other hand, if the position information (x1, y1) indicates a point that belongs to a plurality of rectangular areas managed by the area management table, the table management table 304 ascertains the layer, and outputs an ID number of a rectangular area located in the highest rank, and information (x, y, w, h, layer) associated with the rectangular area to the area detection unit 302 as rectangular area information {ID, x, y, w, h, layer}.

After the area detection unit 302 has output the position ascertainment signal {x1, y1, event A} to the table manager 304, the area detection unit 302 waits for a result input by the table manager 304. If the information "unregistered" and its parameter are input as the result, the area detection unit 302 starts registration processing of the rectangular area. As the registration processing, the area detection unit 302 creates a "rectangle registration" signal represented by a format of {ID, x, y, w, h, layer, event B} and outputs the "rectangle registration" signal to the table manager 304 and the control data generation unit 305. Here, the ID is a parameter that accompanies information "unregistered." For example, the area management table is in the initialized state. If the parameter is ID=1, the area detection unit 302 creates a rectangle registration signal {1, 0, 0, 100, 100, 1, event B}, and outputs the rectangle registration signal to the table manager 304 and the control data generation unit 305. When outputting the rectangle registration signal to the control data generation unit 305, the area detection unit 302 outputs the position ascertainment signal {x1, y1, event A} together.

If the rectangle registration signal is input from the area detection unit 302, the table manager 304 newly registers information contained in the rectangle registration signal into the area management table. FIG. 8A shows a result of new registration work for the area management table conducted by the table manager 304 in the case where the rectangle registration signal {1, 0, 0, 100, 100, 1, event B} has been input when the area management table is in the initialized state. Upon completing the new registration work, the table manager 304 outputs rectangular area information {ID, x, y, w, h, layer} to the area detection unit 302. In the case of FIG. 8A, the table manager 304 outputs rectangular area information {ID=1, x=0, y=0, w=100, h=100, layer=1} to the area detection unit 302. FIG. 8B shows a result of new registration work for the area management table conducted by the table manager 304 in the case where the rectangle registration signal {2, 0, 0, 100, 100, 1, event B} has been input when the area management table is not in the initialized state. In the present embodiment, the table manager 304 ascertains layer information when conducting new registration work to the area management table. If the layer of the rectangle registration signal is present in information already registered in the area management table, the table manager 304 increases the value of the layer of the information already registered by one. If as a result of the increase the layer increased by one overlaps different registered information, the table manager 304 increases the value of the different registered layer by one. In other words, the value of the layer in the information to be newly registered is given priority, and the value of the already registered layer is changed so as not to overlap other layer. FIG. 8B shows a result obtained by newly registering information of the rectangle registration signal {2, 0, 0, 100, 100, 1, event B} into the area management table shown in FIG. 8A. The layer value for ID=1 has been changed from 1 to 2.

If the rectangular area information {ID, x, y, w, h, layer} is input from the table manager 304, the area detection unit 302 stores the input rectangular area information {ID, x, y, w, h, layer} and outputs the rectangular area information to the frame display unit 303.

Figure 9:
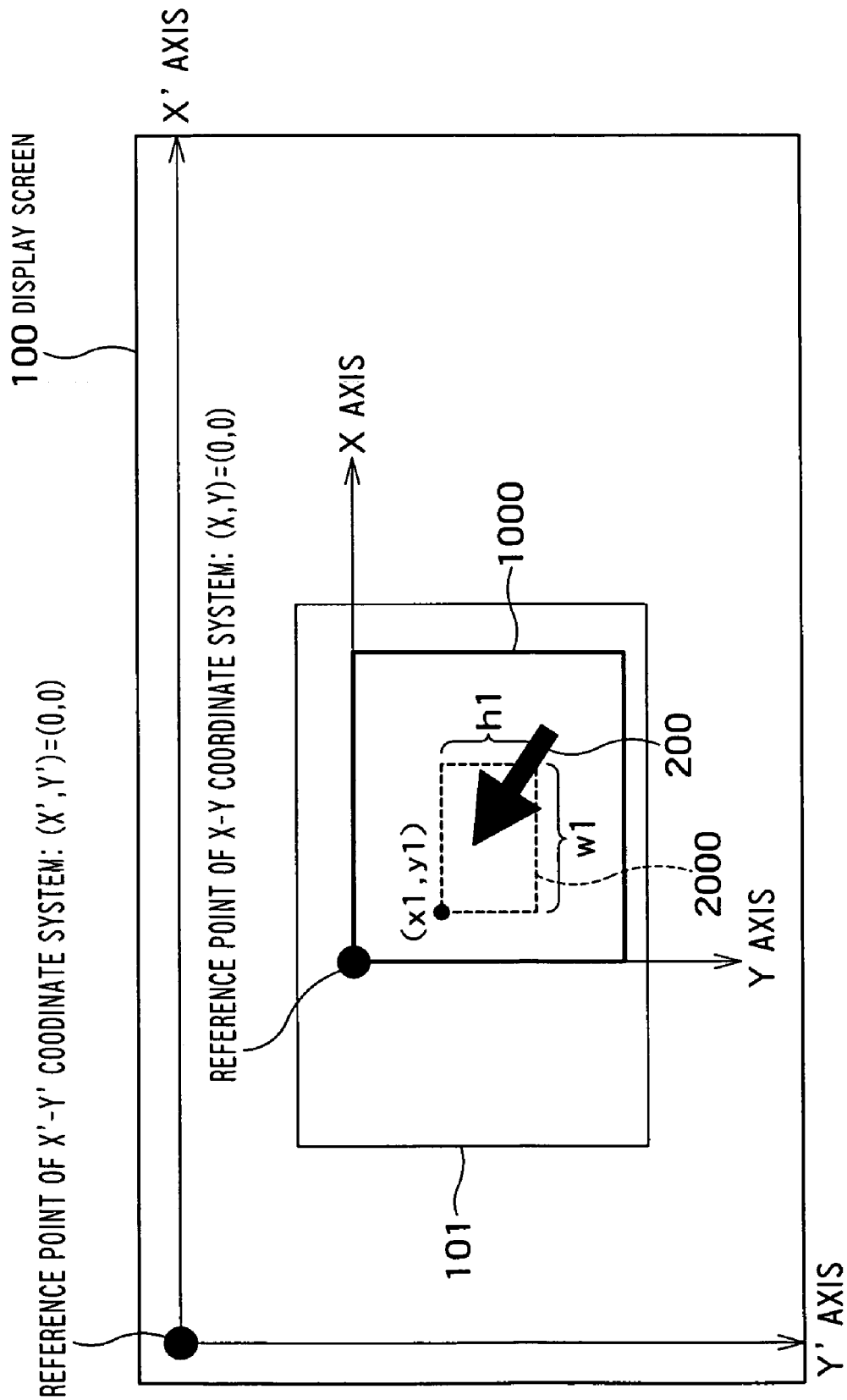
FIG. 9 is a diagram showing a rectangular frame change processing according to a first embodiment of the present invention.

If the rectangular area information {ID, x, y, w, h, layer} is input from the area detection unit 302, the frame display unit 303 causes a rectangular frame 2000 to be displayed on the display area 1000 in the window 101 in the display screen 100 managed using the X-Y coordinates, by utilizing the values of x, y, w and h. FIG. 9 shows the rectangular frame 2000 displayed on the display area 1000 so as to be associated with the rectangular area information {ID=ID1, x=x1, y=y1, w=w1, h=h1, layer=l1 } when the rectangular area information is input. By the way, the rectangular frame 2000 may be a solid line besides the dotted line shown in FIG. 9. Furthermore, the display color of the frame may be changed according to the ID number. As described earlier, the area detection unit 302 stores the rectangular area information {ID, x, y, w, h, layer}. When the area detection unit 302 has deleted stored rectangular area information, the area detection unit 302 outputs a deletion instruction for the rectangular area information {ID, x, y, w, h, layer} to the frame display unit 303. If the deletion instruction is input, the frame display unit 303 executes processing so as not to display the specified rectangular frame. If the value of the rectangular area information {ID, x, y, w, h, layer} stored in the area detection unit 302 has not changed for a predetermined time, the area detection unit 302 deletes the stored rectangular area information. By the way, the area detection unit 302 can change the value of the rectangular area information {ID, x, y, w, h, layer} stored therein by "rectangular frame change processing" described below.

A method used by the user to move the display position of the pointer 200 and change the size and position of the rectangular frame displayed by the frame display unit 303 will now be described. The position of the pointer 200 is detected by the pointer detection unit 301 as described earlier. The pointer detection unit 301 outputs the position information of the pointer 200 (represented utilizing X'-Y' coordinates) and operation event information (such as ON of the left click, OFF of the left click, and ON of the right click) to the area detection unit 302. If the input operation event information is valid, the area detection unit 302 temporarily stores the position information of the pointer 200 (represented utilizing the X'-Y' coordinates) transformed into X-Y coordinates and operation event information. At this time, the area detection unit 302 determines whether the detected position in X-Y coordinates is a point that belongs to at least any one of areas of the rectangular area information pieces {ID, x, y, w, h, layer} stored therein. If the detected position does not belong to any areas, the area detection unit 302 conducts processing concerning the "position ascertainment" signal described earlier. If it is judged that the detected position belongs to at least one of the areas, the area detection unit 302 executes the "rectangular frame change processing" described below. By the way, the foregoing description of processing concerning the "position ascertainment" signal is description for the case where rectangular area information is not stored within the area detection unit 302.

Hereafter, "rectangular frame change processing" will be described with reference to FIG. 9.

First, it is now supposed that the pointer 200 is moved to a vertex of the rectangular frame 2000, and the left click is conducted there. It is also supposed that the pointer 200 is moved while maintaining the left click, and the left click is released after the movement. In this case, the pointer detection unit 301 detects the first left click, and inputs that information to the area detection unit 302. As a result, the area detection unit 302 recognizes start of "rectangular frame change processing" in which the vertex of the rectangular frame 2000 is specified. Subsequently, the pointer detection unit 301 detects the pointer movement, and inputs that information to the area detection unit 302. The area detection unit 302 can recognize it as processing for changing the size of the rectangular frame 2000. Furthermore, the pointer detection unit 301 detects that the left click has been released, and inputs that information to the area detection unit 302. As a result, the area detection unit 302 can recognize that processing for changing the size of the rectangular frame 2000 has been determined, i.e. the end of the "rectangular frame change processing." Upon recognizing that the processing is processing for changing the size of the rectangular frame 2000, the area detection unit 302 changes values of x, y, w, h in the rectangular area information {ID, x, y, w, h, layer} stored therein, as occasion demands, and outputs the changed rectangular area information to the frame display unit 303. For example, in the processing of changing the frame size by moving the position of the left-clicked vertex, the values of x, y, w and h are changed suitably so as to fix the diagonal position for the clicked vertex. Upon recognizing the end of the "rectangular frame change processing," the area detection unit 302 outputs the rectangular area information stored therein at that time to the table manager 304 and the control data generation unit 305 as a "rectangular area" signal. In the middle of the processing for changing the size of the rectangular frame 2000, the rectangular area information is input to the frame display unit 303 from the area detection unit 302 as occasion demands, and the frame display unit 303 conducts change processing of rectangular frame display on the display area 1000. By the way, in the present embodiment, the aspect ratio of the rectangular frame is kept constant. If the pointer position does not satisfy the constant aspect ratio when the end of the "rectangular frame change processing" is recognized, the pointer position is automatically corrected to a point satisfying the constant aspect ratio in the pointer detection unit 301.

Subsequently, it is supposed that the pointer 200 is moved to a position other than a vertex although it is in the rectangular frame 2000, and the left click is conducted there. It is also supposed that the pointer 200 is moved while maintaining the left click, and the left click is released after the movement. In this case, the pointer detection unit 301 detects the first left click, and inputs that information to the area detection unit 302. As a result, the area detection unit 302 recognizes start of "rectangular frame change processing" in which the position other than the vertex of the rectangular frame 2000 is specified. Subsequently, the pointer detection unit 301 detects the pointer movement, and inputs that information to the area detection unit 302. The area detection unit 302 can recognize it as processing for changing the position of the rectangular frame 2000. Furthermore, the pointer detection unit 301 detects that the left click has been released, and inputs that information to the area detection unit 302. As a result, the area detection unit 302 can recognize that processing for changing the position of the rectangular frame 2000 has been determined, i.e. the end of the "rectangular frame change processing." Upon recognizing that the processing is processing for changing the position of the rectangular frame 2000, the area detection unit 302 changes values of x and y in the rectangular area information {ID, x, y, w, h, layer} stored therein, and outputs the changed rectangular area information to the frame display unit 303. For example, supposing that the frame size is not changed in the processing of changing the position, the values of x and y are changed suitably utilizing difference values between the pointer position recognized at the time of start of the "rectangular frame change processing" and the pointer position during the movement. Upon recognizing the end of the "rectangular frame change processing," the area detection unit 302 outputs the rectangular area information stored therein at that time to the table manager 304 and the control data generation unit 305 as a "rectangular area" signal. In the middle of the processing for changing the position of the rectangular frame 2000, the rectangular area information is input to the frame display unit 303 from the area detection unit 302 as occasion demands, and the frame display unit 303 conducts change processing of rectangular frame display on the display area 1000.

Figure 10:
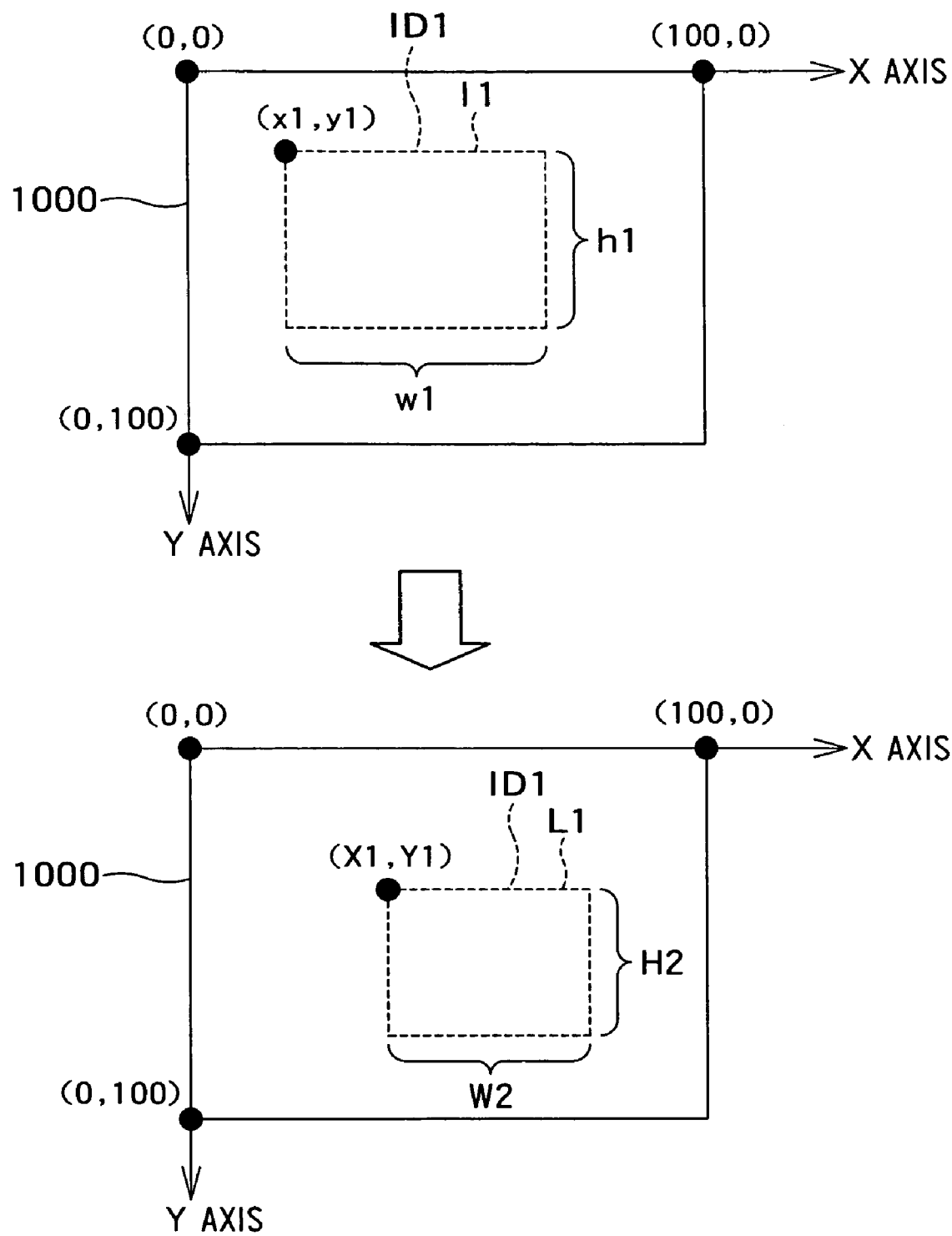
FIG. 10 is a diagram showing an example of a rectangular frame change processing according to a first embodiment of the present invention.
Figure 11:
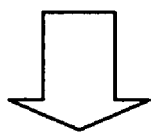
FIG. 11 is a diagram showing an example of an area management table change conducted by rectangular frame change processing according to a first embodiment of the present invention.

When the "rectangular frame change processing" has been completed, the "rectangular area" signal is output from the area detection unit 302 to the table manager 304 as described above. The rectangular area signal is represented as rectangular area signal {ID, x, y, w, h, layer, event C}. If the rectangular area signal {ID, x, y, w, h, layer, event C} is input, the table manager 304 updates associated registration contents in the area management table by utilizing the ID number. FIG. 10 shows a state before the "rectangular frame change processing" for changing the size and position of the rectangular frame is conducted, and a state after the "rectangular frame change processing" for changing the size and position of the rectangular frame has been conducted (the state obtained after both the frame size change and the frame position movement have been conducted). FIG. 11 shows how contents of the area management table are updated as a result of the processing shown in FIG. 10.

If the position ascertainment signal {x1, y1, event A} is input from the area detection unit 302 together with the rectangle registration signal {ID, x, y, w, h, layer, event B}, the control data generation unit 305 constructs a payload portion of a rectangle registration packet to convey information concerning the rectangle registration to the conference server 2. FIG. 12 shows an example of a payload portion of a rectangle registration packet created by the control data generation unit 305 when the rectangle registration signal {ID=1, x=0, y=0, w=100, h=100, layer=1, event B} and the position ascertainment signal {x1=15, y1=20, event A} are input. If the rectangular area signal {ID, x, y, w, h, layer, event C} is input from the area detection unit 302, the control data generation unit 305 constructs a rectangular area packet to convey information concerning the rectangular area to the conference server. FIG. 13 shows an example of a payload portion of a rectangle registration packet created by the control data generation unit 305 when the rectangle registration signal {ID=2, x=10, y=20, w=50, h=50, layer=3, event C} is input. Upon creating a rectangle registration packet or a rectangular area packet, the control data generation unit 305 outputs it to the control data transmission processor 306.

If the rectangle registration packet or the rectangular area packet is input from the control data generation unit 305, the control data transmission processor 306 outputs the control packet (the rectangle registration packet or the rectangular area packet) to the network communication processor 500 together with additional information such as destination address information of the network required to transmit the control packet to the conference server 2. If the control packet with the additional information added (hereafter referred to simply as control packet) is input from the control data transmission processor 306, the network communication processor 500 transmits the control packet to the conference server 2 via the communication path 3-12.

If the conference server 2 receives the control packet from the video conference terminal device 1 via the communication path 3-12 and recognizes that the control packet is the rectangle registration packet or the rectangular area packet, the control information processor 70 in the conference server 2 analyzes the packet, and changes the composite video image by creating a control signal for the video composition processor 50 and outputting the control signal to the video composition processor 50. It is now supposed that the received video images 20B, 20C, 20D and 20E managed by the conference server 2 and ID numbers contained in the rectangle registration packets and the rectangular area packets are associated with each other in one-to-one correspondence. In the conference server 2 as well, the position in the composite video image 60A is managed using X-Y coordinates with the horizontal direction and the vertical direction normalized to a value of 100 in the same way as the display area 1000 in the window 101 in the video conference terminal device 1. A received signal associated with an ID number can be disposed in a position, size and layer specified by the rectangle registration packet and the rectangular area packet. Details concerning the conference server 2 will be described in detail later.

Hereafter, how the composite video control instruction generator 300, which forms a feature of the present embodiment functions in the state in which the conference video display processor 400 causes a video image received from the conference server 2 to be displayed on the display screen 100, will be described by using several examples.

FIRST EXAMPLE

It is now supposed that the composite video image received from the conference server 2 and displayed in the display area 1000 is shown in FIG. 14A. It is supposed that the area management table managed by the table manager 304 is in the initialized state at this time. The pointer 200 is moved to a position (15, 20) in the display area 1000, and a left click operation is conducted. As a result, for example, a rectangle registration signal rectangle registration signal {1, 0, 0, 100, 100, 1, event B} is generated in the composite video control instruction generator 300, and the area management table is updated as shown in FIG. 14D. The composite video control instruction generator 300 causes a rectangular frame 2000 shown in FIG. 14B to be displayed in the display area 1000, generates a rectangle registration packet shown in FIG. 14C, and transmits the rectangle registration packet to the conference server 2. The conference server 2 creates a composite video image; as for a video image displayed in a position of (15, 20) shown in FIG. 14A, x=0 and y=0 are taken as reference, size is w=100 and h=100, and the layer is set to 1, and transmits the composite video image to the video conference terminal device 1. As shown in FIG. 14B, therefore, a portion displayed as a part 1001 of the composite image as shown in FIG. 14A is displayed on the display area 1000 so as to coincide with the rectangular frame 2000. By the way, at this time, the composite video control instruction generator 300 may create a dialog 3000 for notifying that the registration work has been completed, and display the dialogue on the display area 1000.

The first example indicates a method by which the composite video control instruction generator 300 according to the present invention registers a rectangular area in the display area 1000 on which a composite video image is displayed, and the registered rectangular area is squared with the display position of the video image disposed on a specified point in the display area 1000.

SECOND EXAMPLE

Figures 16A, 16B:
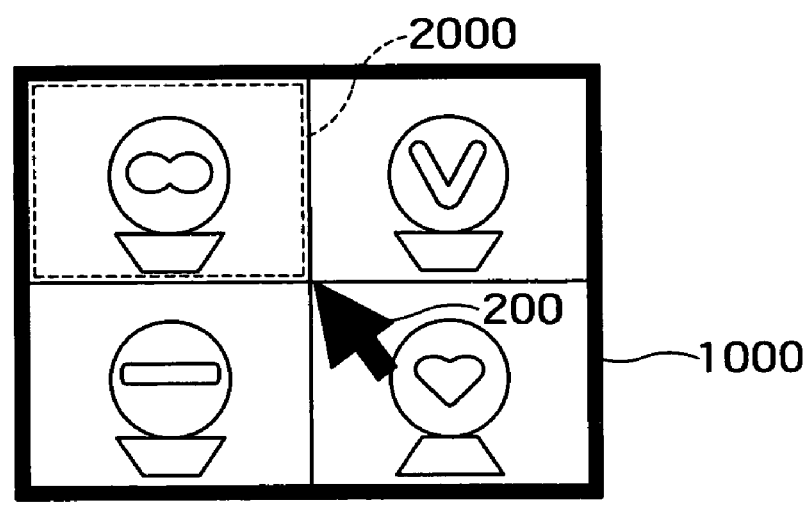
FIGS. 16A and 16B are a diagram showing a second example of how a composite video control instruction generator functions according to a first embodiment of the present invention.

FIG. 15A shows a state in which a predetermined time elapses after the operation described in the first example and the display of the rectangular frame 2000 disappears. As shown in FIG. 15B, the pointer 200 is moved to a certain point in the display area 1000 and a left click operation is conducted. Since the area management table has contents shown in FIG. 14D, rectangular area information is generated in the composite video control instruction generator 300. As a result of generation of the rectangular area information, the composite video control instruction generator 300 displays a rectangular frame 2000 in the display area 1000 as shown in FIG. 15B. Subsequently, the pointer 200 is moved to a lower right-hand vertex of the rectangular frame 2000 shown in FIG. 15B, and left click is conducted in that position. The pointer is moved to a position shown in FIG. 15C. As a result, the "rectangular frame change processing" is executed in the composite video control instruction generator 300. As a result of the "rectangular frame change processing," the area management table is updated as shown in FIG. 16A. The composite video control instruction generator 300 creates a rectangular area packet shown in FIG. 15D, and transmits the rectangular area packet to the conference server 2. The conference server 2 creates a composite video image; as for a video image associated with the ID number 1, x=0 and y=0 are taken as reference, size is w=50 and h=50, and the layer is set to 1, and transmits the composite video image to the video conference terminal device 1. As shown in FIG. 16B, therefore, a video image displayed as a part of the composite image and associated with the ID number 1, and the rectangular frame 2000 are displayed on the display area 1000 so as to coincide them with each other.

In the second example, after the registered rectangular area is coincided with displayed position of the video image disposed on a specified point in the display area 1000, the composite video image is also changed by changing the rectangular frame indicating rectangular area that is displayed in the display area 1000 and is registered.

THIRD EXAMPLE

In the first example, a rectangle registration packet shown in FIG. 17A is generated from a rectangle registration signal {1, 0, 0, 100, 100, 1, event B}, and transmitted to the conference server 2. As a result, a video image associated with information registered in the area management table is maximized and displayed on the display area 1000 as shown in FIG. 14B. Here, the rectangular registration signal may be, for example, {1, 25, 25, 50, 50, 1, event B} or {1, 15, 20, 50, 50, 1, event B}. In that case, the rectangle registration packet becomes as shown in FIG. 17B or FIG. 17C. The result differs from FIG. 14B. In the case of FIG. 17B, a video image associated with information registered in the area management table is displayed in a central part in the display area 1000. In the case of FIG. 17C, a video image associated with information registered in the area management table is displayed in the display area 1000 with a point indicated by the pointer 200 taken as the reference.

FOURTH EXAMPLE

In the first example, a composite video image displayed in the display area 1000 when the area management table managed by the table manager 304 is in the initialized state becomes as shown in FIG. 14A, and the rectangle registration signal orders maximization. In a fourth example, a composite video image obtained when the area management table is in the initialized state becomes as shown in FIG. 18A and the rectangle registration signal indicates that "display in a central part." First, the pointer 200 is moved to a position (90, 70) in the display area 1000, and a left click operation is conducted. As a result, a rectangle registration signal {1, 25, 25, 50, 50, 1, event B} is generated in the composite video control instruction generator 300, and the area management table is updated as shown in FIG. 18D. The composite video control instruction generator 300 causes a rectangular frame 2000 shown in FIG. 18B to be displayed in the display area 1000, generates a rectangle registration packet shown in FIG. 18C, and transmits the rectangle registration packet to the conference server 2. The conference server 2 creates a composite video image; as for a video image displayed in a position of (90, 70) shown in FIG. 18A, x=25 and y=25 are taken as reference, size is w=50 and h=50, and the layer is set to 1, and transmits the composite video image to the video conference terminal device 1. As shown in FIG. 18B, therefore, a portion displayed as a part 1003 of the composite image as shown in FIG. 18A is displayed on the display area 1000 so as to coincide with the rectangular frame 2000. By the way, at this time, the composite video control instruction generator 300 may create a dialog 3000 for notifying that the registration work has been completed, and display the dialogue on the display area 1000.

FIFTH EXAMPLE

Figure 19A:
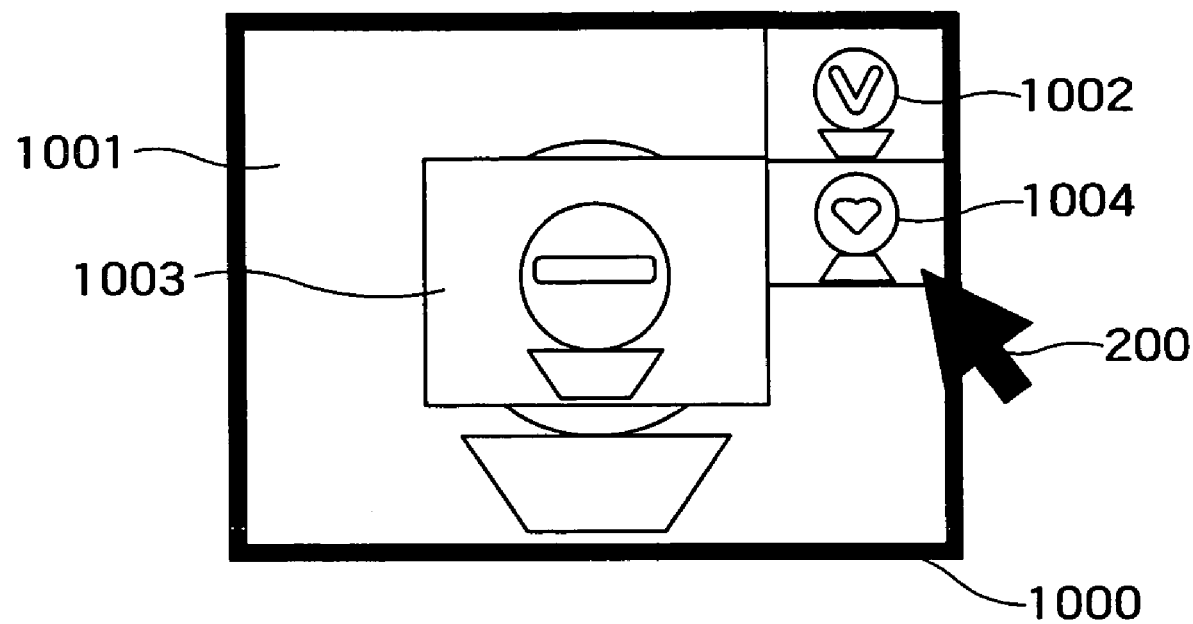
FIGS. 19A and 19B are a diagram showing a fifth example of how a composite video control instruction generator functions according to a first embodiment of the present invention.
Figure 19B:
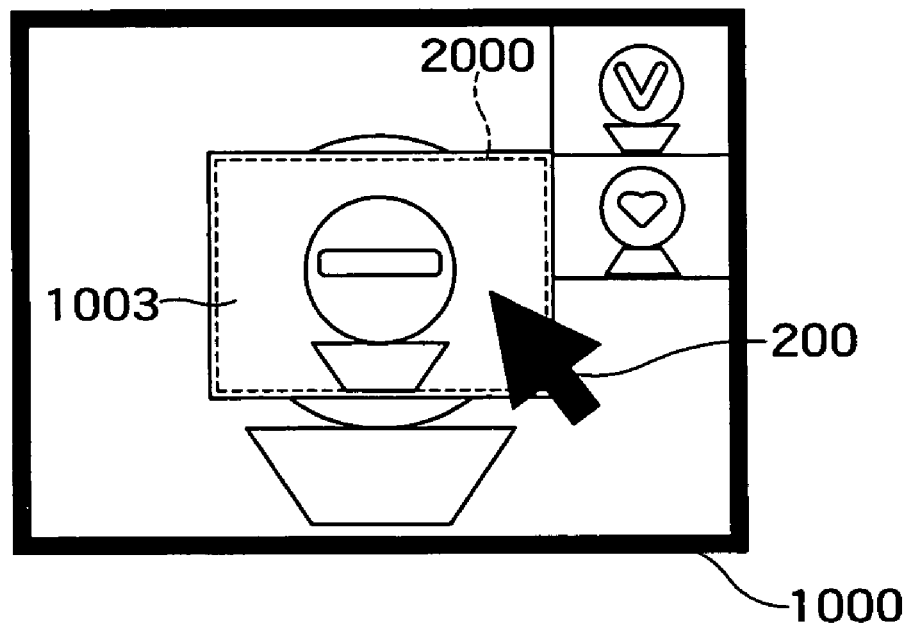

FIG. 19A shows a state in which a predetermined time elapses after the operation described in the fourth example and the display of the rectangular frame 2000 disappears. As shown in FIG. 19B, the pointer 200 is moved to a certain point in the display area 1003 and a left click operation is conducted. Since the area management table has contents shown in FIG. 18D, rectangular area information is generated in the composite video control instruction generator 300. As a result of generation of the rectangular area information, the composite video control instruction generator 300 displays a rectangular frame 2000 in the display area 1000 as shown in FIG. 19B. On the other hand, the case where the pointer 200 is moved to a certain point in a display area 1004 as shown in FIG. 19A and a left click operation is conducted, will be described in a sixth example as shown in FIG. 19A.

SIXTH EXAMPLE

FIG. 20A shows a state in which a predetermined time elapses after the operation described in the fourth example and the display of the rectangular frame 2000 disappears. The pointer 200 is moved to a position (90, 45) in the display area 1000, and a left click operation is conducted. Since the area management table has contents as shown in FIG. 18D, therefore, a rectangle registration signal {2, 25, 25, 50, 50, 1, event B} is generated in the composite video control instruction generator 300, and the area management table is updated as shown in FIG. 20D. The composite video control instruction generator 300 causes a rectangular frame 2000 shown in FIG. 20B to be displayed in the display area 1000, generates a rectangle registration packet shown in FIG. 20C, and transmits the rectangle registration packet to the conference server 2. The conference server 2 creates a composite video image; as for a video image displayed in a position of (90, 45) shown in FIG. 20A, x=25 and y=25 are taken as reference, size is w=50 and h=50, and the layer is set to 1, and transmits the composite video image to the video conference terminal device 1. As shown in FIG. 20B, therefore, a portion displayed as a part 1004 of the composite image as shown in FIG. 20A is displayed on the display area 1000 so as to coincide with the rectangular frame 2000. By the way, at this time, the composite video control instruction generator 300 may create a dialog 3000 for notifying that the registration work has been completed, and display the dialogue on the display area 1000.

SEVENTH EXAMPLE

In a seventh example, layout of a composite video image is changed from a state in which registration of four areas is completed and ID1, ID2, ID3 and ID4 are assigned respectively to the four areas by the composite video control instruction generator 300. It is now supposed that registration contents in the area management table are as shown in FIG. 23A in a state shown in FIG. 21A. FIG. 21B shows a result obtained by execution of the "rectangular frame change processing" from the state shown in FIG. 21A. At this time, a rectangular area packet shown in FIG. 22A is created, and registration contents in the area management table becomes as shown in FIG. 23B. FIG. 21C shows a result obtained by execution of the "rectangular frame change processing" from the state shown in FIG. 21B. At this time, a rectangular area packet shown in FIG. 22B is created, and registration contents in the area management table becomes as shown in FIG. 23C.

EIGHTH EXAMPLE

In the "rectangular frame change processing" described earlier, the area detection unit 302, which has recognized the end of the "rectangular frame change processing," outputs the rectangular area information stored therein at that time to the table manager 304 and the control data generation unit 305 as a "rectangular area" signal. On the other hand, in the middle of the processing for changing the size or position of the rectangular frame 2000, the rectangular area information is input to the frame display unit 303 from the area detection unit 302 as occasion demands, and the frame display unit 303 conducts change processing of rectangular frame display on the display area 1000. However, outputting of the rectangular area signal to the table manager 304 and the control data generation unit 305 conducted by the area detection unit 302 is not restricted to the time when the end of the "rectangular frame change processing" has been recognized. The outputting may be conducted as occasion demands in the same way as the outputting of the rectangular area information to the frame display unit 303. For example, when moving the pointer 200 and changing the size of a rectangular frame 2000 so as to cause a transition from a state shown in FIG. 24A to a state shown in FIG. 24B, rectangular area packets shown in FIG. 24C to FIG. 24G may be created and transmitted to the conference server 2. By thus transmitting rectangular area packets as occasion demands, the arrangement of video images in the composite video image continues to be changed even while the "rectangular frame change processing" is being conducted. As a result, a change of the composite video image following the change operation of the rectangular frame 2000 can be anticipated.

Heretofore, the present embodiment has been described taking left click as an example of operation event information detected by the pointer detection unit 301 in the composite video control instruction generator 300. However, the operation event information is not necessarily restricted to the left click. For example, separate kinds of operation event information may be used for execution. For example, as for operation event information that causes the composite video control instruction generator 300 to function so as to register a rectangular area in the display area 1000 on which the composite video image is displayed, double click is validated. When conducting the "rectangular frame change processing" in the registered state, left click is validated. Furthermore, if the video conference terminal device 1 includes a keyboard, operation event information generated by key operation may also be utilized. By using separate operation events, it is possible to prevent false functions that the user does not intend. As to the operation in the state in which the rectangular frame 2000 is displayed, only the "rectangular frame change processing" is described in the present embodiment described heretofore. It is also possible to add the following processing. For example, a menu is displayed in response to right click. If an item "delete" is selected from the menu, the rectangular frame 2000 which is currently being displayed is eliminated. In addition, registration information for the rectangular area registered in the area management table is deleted. Such processing can be added. Furthermore, when registration information has been deleted, it is necessary to transmit a control packet to the conference server 2 as well to order the registration information to be deleted. The control packet for deleting registration information is referred to as rectangle registration deletion packet. The rectangle registration deletion packet may also be defined separately. Alternatively, for example, the rectangle registration packet described earlier may also be utilized as the rectangle registration deletion packet. In this case, values of x, y, w, h and ID are set equal to 0 in the payload portion shown in FIG. 12, and only the ID number, x1 and y1 are validated. A resultant packet is utilized as the rectangle registration deletion packet. Here, the ID number, x1 and y1 can be detected from information registered in the area management table, by utilizing information of the position detected by the pointer detection unit 301 and the area detection unit 302 when deletion is specified.

In the case where operation event information used to cause operation to register a rectangular area and operation event information used to conduct the "rectangular frame change processing" in the registered state are made separate from each other, it becomes possible to, for example, conduct operation of re-registration on the already registered rectangular area. For example, it is supposed that a rectangular area is maximized on the display screen when the rectangular area is registered. Thereafter, the rectangular area is changed to become smaller by the "rectangular frame change processing." Then, operation event information is generated to conduct registration on the rectangular area again. As a result, re-registration processing for the rectangular area is conducted. The rectangular area is maximized on the display screen.

In the foregoing description of the present embodiment, the communication path 3-12 is utilized as the communication path used to transmit a control signal from the video conference terminal device 1 to the conference server 2. If a communication path for exercising call control is set between the video conference terminal device 1 and the conference server 2, a control signal may be transmitted from the video conference terminal device 1 to the conference server 2 by utilizing the existing communication path.

Hereafter, a configuration and operation of the conference server 2 will be described.

Figure 25:
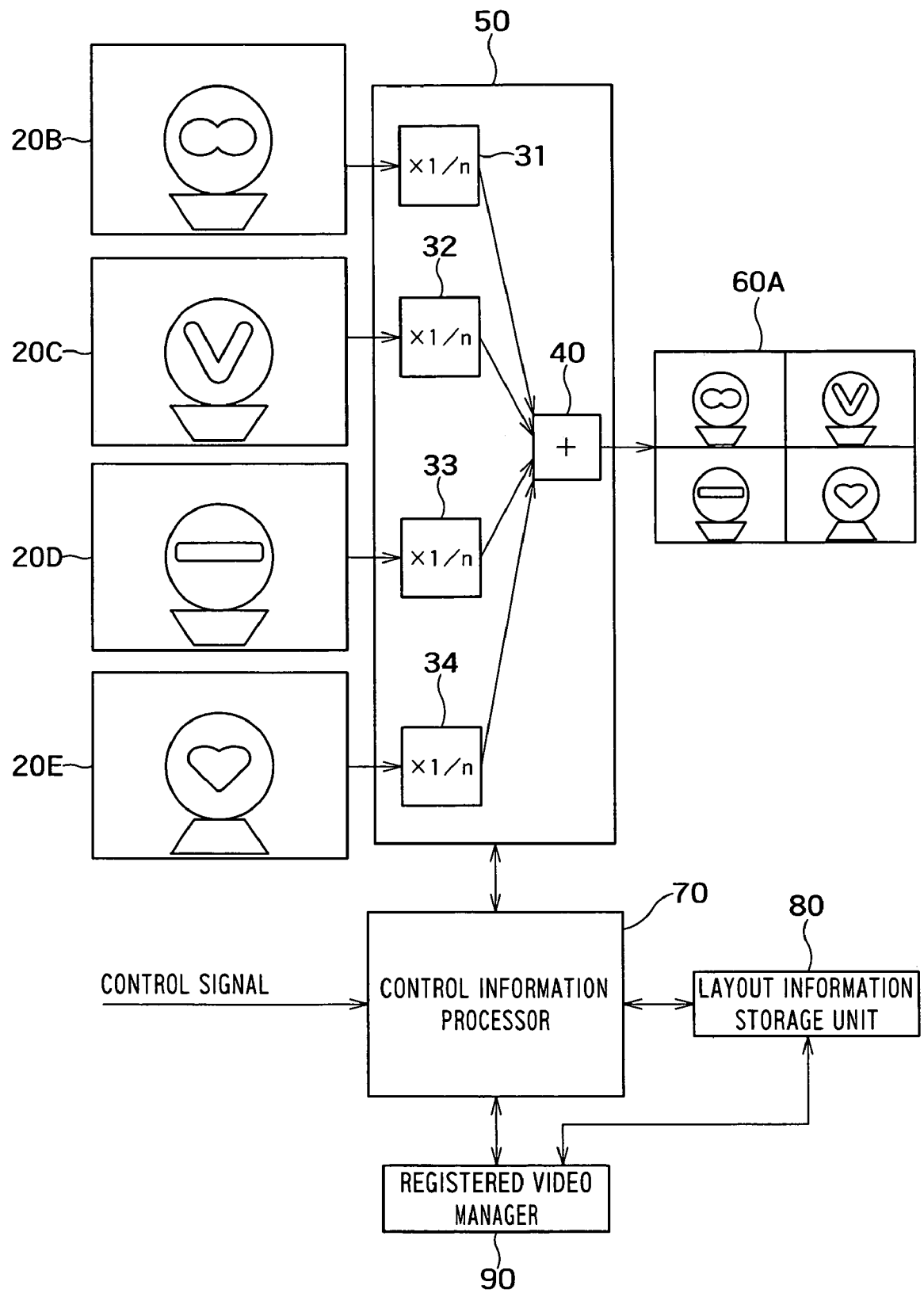
FIG. 25 is a block diagram showing a configuration of a conference server according to a first embodiment of the present invention.

FIG. 25 shows a configuration of the conference server 2 according to an embodiment of the present invention. In FIG. 25, expression of components (such as the CPU) that do not exert direct influence in implementing function improvements according to the present invention is omitted. The conference server 2 includes a layout information storage unit 80 and a registered video manager 90 in addition to the video composition processor 50 and the control information processor 70 in the conference server S shown in FIG. 2. Furthermore, the control information processor 70 has expansion function in the present embodiment. The layout information storage unit 80 corresponds, for example, a layout information manager and a layout information update unit. The registered video manager corresponds, for example, a video manager. The video composition processor 50 corresponds, for example, a composite video generation unit, a video source receiving unit, and a transmitting unit. Functions represented by the configuration shown in FIG. 25 may be implemented by causing a computer to execute a program generated using an ordinary programming technique, or using hardware.

FIG. 25 shows a configuration which creates one composite video image 60A from four video sources (20B, 20C, 20D and 20E). However, the video composition processor 50 may also have a configuration capable of composing video sources equal to or more than five video sources. FIG. 25 shows a configuration which creates only one composite image. Alternatively, a configuration which can create a plurality of composite images and deliver the composite images to different video conference terminal devices may also be used.

If the conference server 2 receives a control packet from the video conference terminal device 1 via the communication path 3-12, the received control packet is input to the control information processor 70 as a control signal. The control information processor 70 analyzes the control signal input thereto. Upon recognizing that the control signal is a rectangle registration packet or a rectangular area packet, the control information processor 70 analyzes it, creates a control signal for the video composition processor 50, and outputs the control signal to the video composition processor 50. In this way, the control information processor 70 changes the composite video image. By the way, it is supposed in the present embodiment that each of video sources (20B, 20C, 20D, 20E) and the composite video image 60A are equal in size and aspect ratio.

Figures 26, 27:
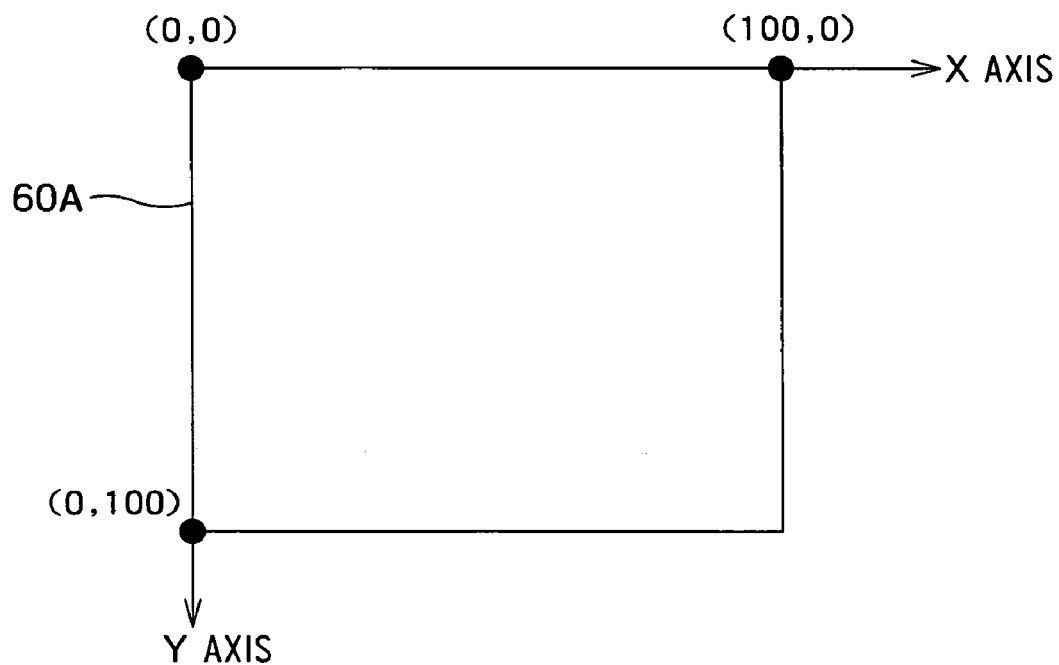
FIG. 26 is a diagram showing coordinate axes of a composite video image in a conference server according to a first embodiment of the present invention.
FIG. 27 is a diagram showing an example of a layout information management table according to a first embodiment of the present invention.

The layout information storage unit 80 manages arrangement positions of video sources in the composite video image. The arrangement position is managed utilizing X-Y coordinates obtained by normalizing the horizontal direction and vertical direction to the value of 100 as shown in FIG. 26. Furthermore, the layout information storage unit 80 retains, for example, a layout information management table shown in FIG. 27, and manages arrangement positions of respective video sources by utilizing X-Y coordinates shown in FIG. 26. In the layout information management table of the present embodiment, numbers of size change circuits (31, 32, 33, 34) included in the video composition processor 50 are used as IDs of respective video sources. Information of downscaling (1/n) as to the length of one side conducted by the size change circuits, and an arrangement position (x, y) with reference to the upper left end, a size (w, h) and a layer of each of the downscaled video sources are described in the layout information management table of the present embodiment.

The arrangement positions of respective video sources stored and managed by the layout information storage unit 80 are updated according to an order issued by the control information processor 70 which has received a control signal. The layout information storage unit 80 manages default values concerning the arrangements of respective video sources. At the time of initialization or the like, the control information processor 70 acquires default layout information from the layout information storage unit 80, and designates a composition method to the video composition processor 50. By the way, FIG. 27 shows an example of default layout information as well. It is supposed that the video sources are arranged so as not to overlap each other and layers of respective video sources are predetermined as default values.

If a control signal which is a control packet is input from the video conference terminal device 1, the control information processor 70 conducts format analysis. If the control signal has the format shown in FIG. 12, the control information processor 70 recognizes the control packet as a rectangle registration packet. If the control signal has the format shown in FIG. 13, the control information processor 70 recognizes the control packet as a rectangular area packet. Upon recognizing the control packet as a rectangle registration packet, the control information processor 70 outputs information {ID, x, y, w, h, layer, x1, y1} contained in the rectangle registration packet as a format analysis result, to the registered video manager 90 as rectangle registration information. Upon recognizing the control packet as a rectangular area packet, the control information processor 70 outputs information {ID, x, y, w, h, layer} contained in the rectangular area packet as a format analysis result, to the registered video manager 90 as rectangular area information.

If the rectangle registration information {ID, x, y, w, h, layer, x1, y1} is input, the registered video manager 90 refers to the layout information management table managed by the layout information storage unit 80, and detects one of the ID numbers (31, 32, 33 and 34 in FIG. 26) of video sources that are present in an area in which x1 and y1 are included. By the way, if x1 and y1 are included in a plurality of video areas, the registered video manager 90 selects an ID number of a video area having a highest layer (a video area having a smallest layer number, in the present embodiment). Upon being successful in detection of the video source ID number in response to the rectangle registration information input, the registered video manager 90 stores the value of the ID contained in registration information and the ID number of the selected video source in a pair form, and then outputs the ID number of the selected video source to the control information processor 70. On the other hand, if the rectangular area information {ID, x, y, w, h, layer} is input, the registered video manager 90 outputs an ID number of a video source stored so as to be associated with the value of the ID contained in the rectangular area information to the control information processor 70.

As a result of outputting the rectangle registration information or the rectangular area information to the registered video manager 90, the ID number of the video source from the registered video manager 90 is input to the control information processor 70. In addition, the control information processor 70 analyzes the value of {x, y, w, h} contained in the rectangle registration information or the rectangular area information, and calculates a value of a downscaling factor (1/n) of the video source. As a result of these kinds of processing, the control information processor 70 creates information {ID, n, x, y, w, h, layer} required for registration in the layout information management table and updates contents of the layout information management table managed by the layout information storage unit 80, on the basis of information contained in the control packet from the video conference terminal device 1 which is the input control signal. It is now supposed that the value of the layer for the ID number of the associated video source is changed when updating contents of the layout information management table. If in this case the layer is present in already registered information in the layout information management table, the value of the layer already registered is increased by one. If as a result overlapping occurs with respect to different already registered information, the value of the different already registered layer is increased by one. If update of the layout information management table is completed, the control information processor 70 issues an order to the video composition processor 50 with contents described in the layout information management table, and make the video composition processor 50 change the layout of the composite video image.

Heretofore, the detailed configurations and operations of the video conference terminal device 1 and the conference server 2 have been described as the first embodiment of the present invention.

In the video conference terminal device having a function of merely displaying a composite image received from the conference server 2, the composite video image is nothing but one video image. It is not clear that the composite video image includes a plurality of video sources, and the boundaries between video sources are not clear, either. By incorporating the composite video control instruction generator 300, which forms one of great features of the present embodiment, however, it becomes possible to detect the boundaries between the video sources contained in the composite video image.

For example, by merely aligning the pointer with one point in the composite video image and conducting a simple operation such as click, it is possible to display a rectangular frame so as to superpose it on a video image displayed there. This rectangular frame represents a boundary of the video source in the composite video image. After the rectangular frame has been displayed, it becomes possible to freely change the size and position of the video source having the detected boundary in the composite video image by changing the size and position of the rectangular frame with a combination of pointer and click operations.

As a method for detecting boundaries of a plurality of video sources in the composite video image without conducting complicated processing such as image analysis, it is possible to conceive a method of separately sending a notice of composition information from the conference server 2 or a method of sending an acquisition request for composite information from the video conference terminal device 1 to the conference server 2 and acquiring the composite information. In the video conference terminal device 1 incorporating the composite video control instruction generator 300 therein, it is possible to detect the boundaries of a plurality of video sources and freely change the size and position of each of the video sources having detected boundaries in the composite video image, on a unidirectional communication path used only to transmit a control signal from the video conference terminal device 1 to the conference server 2. In other words, it is not necessary to mount the processing for receiving the composite information.

Furthermore, in the video conference terminal device 1 incorporating the composite video control instruction generator 300 therein, a rectangular frame which indicates boundary of a video source is generated by the video conference terminal device 1. Therefore, a change of the size or position of the rectangular frame itself can be implemented in real time. As a result, it is possible to provide the user who operates the video conference terminal device 1 with operation feeling free from a delay.

Second Embodiment

Hereafter, a second embodiment of the present invention will be described with reference to FIGS. 28 to 34.

In the first embodiment, the method of displaying a rectangular frame so as to superpose it on a video image displayed in the display area 1000, by specifying a point in the display area 1000, has been described. In the present embodiment, however, a method of displaying a rectangular frame so as to superpose it on a video image displayed in the display area 1000 by specifying an area will be described. In the present embodiment, configurations of the video conference terminal device 1 and the conference server 2 are the same as those in the first embodiment. However, the present embodiment differs from the first embodiment in the operation of the area detection unit 302.

Figure 28:
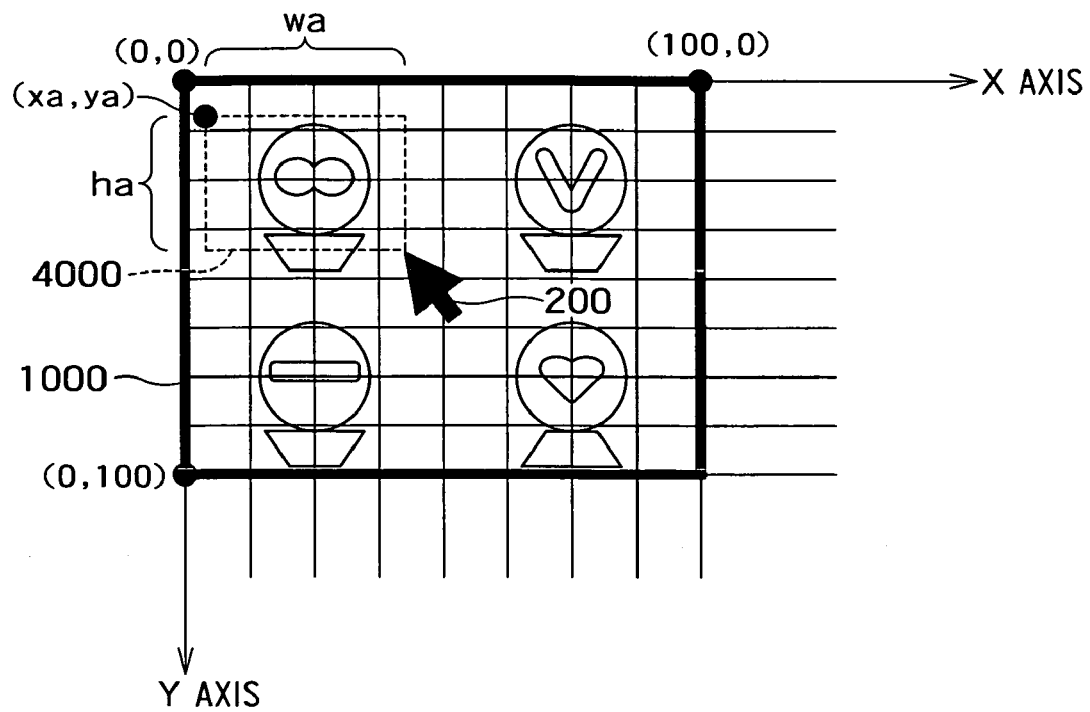
FIG. 28 is a diagram showing how area specification is conducted according to a second embodiment of the present invention.

FIG. 28 shows how area specification is conducted. In FIG. 28, a point specified first by the pointer 200 has X-Y coordinates (xa, ya) in the display area 1000. From the point, the pointer 200 is moved by wa in the horizontal direction and by ha in the vertical direction. An area specified by this operation becomes a specified area 4000.

Figure 29:
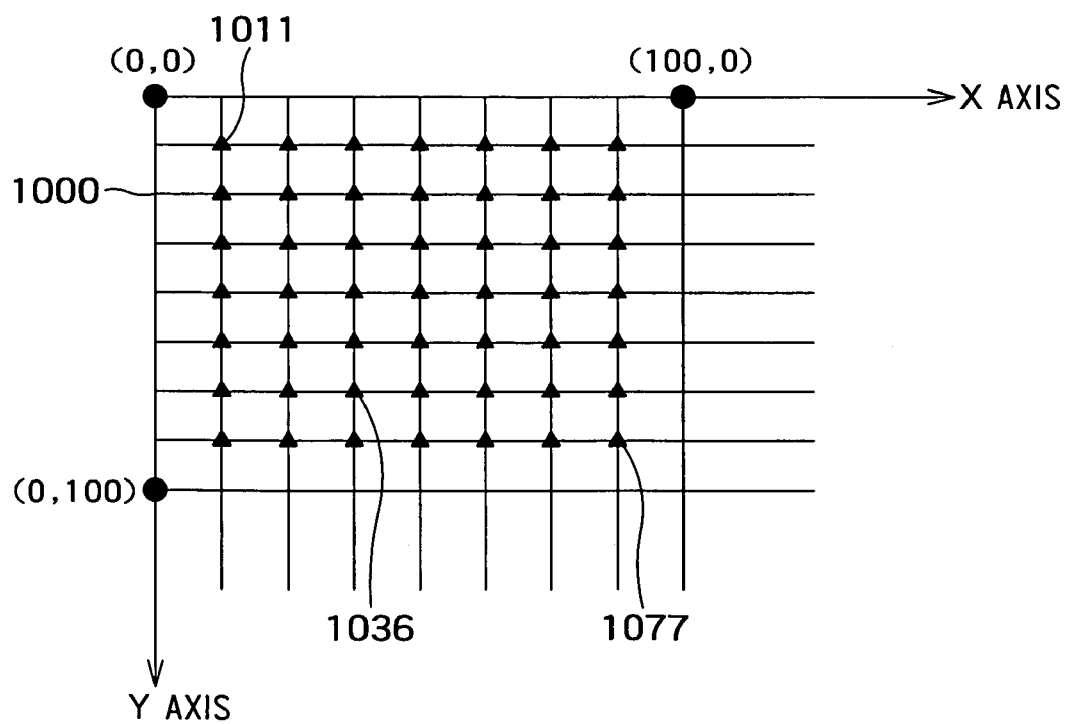
FIG. 29 is a diagram showing restrictions imposed on the display position of a rectangular frame according to a second embodiment of the present invention.
Figure 30A:
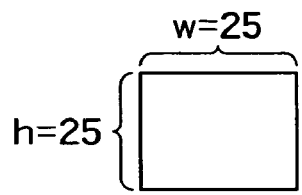
FIGS. 30A to 30D are a diagram showing restrictions imposed on the size of a rectangular frame according to a second embodiment of the present invention.
Figure 30B:
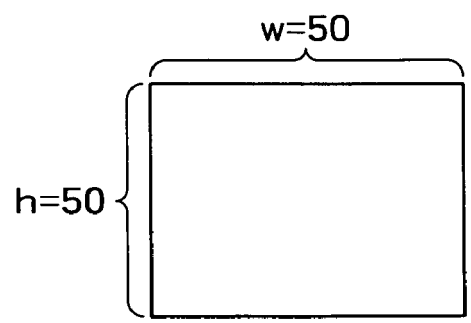
Figure 30C:
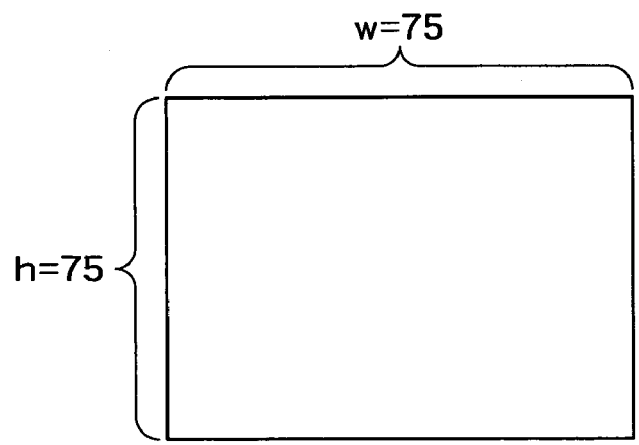
Figure 30D:
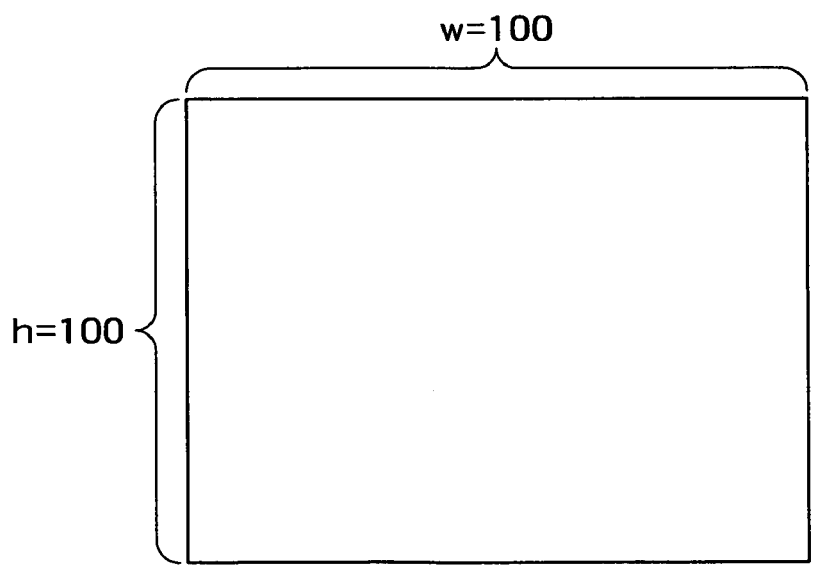

If the area specifying operation is conducted, thereafter restrictions are imposed on the position in which the rectangular frame is disposed. In the present embodiment, a position for displaying the rectangular frame therein is determined so as to place the center position of the rectangular frame on one of points indicated by Δ in FIG. 29. Here, points Δ in FIG. 29 are intersections of lines obtained by dividing an interval between 0 and 100 on the X axis into eight equal parts and lines obtained by dividing an interval between 0 and 100 on the Y axis into eight equal parts. There are 49 points Δ. For example, Δ1011 is located in (12.5, 12.5), and Δ1077 is located in (87.5, 87.5). And Δ1036 is located in (37.5, 75.0).

Furthermore, if the area specifying operation is conducted, thereafter restrictions are imposed on the size in which the rectangular frame is disposed. In the present embodiment, there are four sizes of the rectangular frame as shown in FIG. 30. For example, FIG. 30A has a size of w=25 and h=25 in normalized X-Y coordinates.

For example, upon detecting movement and operation events of the pointer 200 as shown in FIG. 28, the pointer detection unit 301 outputs the information to the area detection unit 302 as occasion demands. The area detection unit 302 determines whether position information of the pointer that is input first from the pointer detection unit 301 is already registered in the table manager 304. If it is already registered, the area detection unit 302 conducts operation described with reference to the first embodiment. On the other hand, if information "unregistered" is given from the table manager 304, the rectangular area registration processing is started immediately in the first embodiment. In the present embodiment, however, the area detection unit 302 detects whether the operation is the area specifying operation by utilizing information subsequently input from the pointer detection unit 301. If the operation is judged not to be the area specifying operation, the area detection unit 302 may execute the rectangular area registration processing described with reference to the first embodiment. On the other hand, if the operation is judged to be the area specifying operation, the area detection unit 302 analyzes information input from the pointer detection unit 301, and recognizes information of the specified area 4000 {xa, ya, wa, ha}. Since the specified area 4000 is validated only in the display area 1000, however, the specified area 4000 is invalidated if the position of the pointer 200 gets out of the display area 1000.

Upon recognizing the information of the specified area 4000 {xa, ya, wa, ha}, the area detection unit 302 transforms {xa, ya, wa, ha} to {xb, yb, wb, hb} according to the following condition expressions.

Transformation of wa to wb
If $0 < wa \leq 25.0$, then wb=25.0.
If $25.0 < wa \leq 50.0$, then wb=50.0.
If $50.0 < wa \leq 75.0$, then wb=75.0.
If $75.0 < wa \leq 100.0$, then wb=100.0.
Transformation of ha to hb
If $0 < ha \leq 25.0$, then hb=25.0.
If $25.0 < ha \leq 50.0$, then hb=50.0.
If $50.0 < ha \leq 75.0$, then hb=75.0.
If $75.0 < ha \leq 100.0$, then hb=100.0.
If wb is different in value from hb, however, it is set that ha=wa in the present embodiment.
Transformation of xa to xb
If $0 \leq xa < 12.5$, then xtmp=0.
If $12.5 \leq xa < 25.0$, then xtmp=12.5.
If $25.0 \leq xa < 37.5$, then xtmp=25.
If $37.5 \leq xa < 50.0$, then xtmp=37.5.
If $50.0 \leq xa < 62.5$, then xtmp=50.
If $62.5 \leq xa < 75.0$, then xtmp=62.5.
If $75.0 \leq xa < 87.5$, then xtmp=75.
If $87.5 \leq xa < 100.0$, then xtmp=87.5.
If $0 < xtmp + wb/2 \leq 18.75$, then xc=12.5.

If 18.75<xtmp+wb/2≦31.25, then xc=25.0.
If 31.25<xtmp+wb/2≦43.75, then xc=37.5.
If 43.75<xtmp+wb/2≦56.25, then xc=50.0.
If 56.25<xtmp+wb/2≦68.75, then xc=62.5.
If 68.75<xtmp+wb/2≦81.25, then xc=75.0.
If 81.25<xtmp+wb/2≦100.0, then xc=87.5.
xb=xc−wb/2

Transformation of ya to yb
If 0≦ya<12.5, then ytmp=0.
If 12.5≦ya<25.0, then ytmp=12.5.
If 25.0≦ya<37.5, then ytmp=25.
If 37.5≦ya<50.0, then ytmp=37.5.
If 50.0≦ya<62.5, then ytmp=50.
If 62.5≦ya<75.0, then ytmp=62.5.
If 75.0≦ya<87.5, then ytmp=75.
If 87.5≦ya<100.0, then ytmp=87.5.
If 0<ytmp+hb/2≦18.75, then yc=12.5.
If 18.75<ytmp+hb/2≦31.25, then yc=25.0.
If 31.25<ytmp+hb/2≦43.75, then yc=37.5.
If 43.75<ytmp+hb/2≦56.25, then yc=50.0.
If 56.25<ytmp+hb/2≦68.75, then yc=62.5.
If 68.75<ytmp+hb/2≦81.25, then yc=75.0.
If 81.25<ytmp+hb/2≦100.0, then yc=87.5.
yb=yc−hb/2

Upon completing the processing of the transformation to {xb, yb, wb, hb}, the area detection unit 302 creates a rectangle registration signal {IDa, xb, yb, wb, hb, 1, event B}, and outputs the rectangle registration signal to the table manager 304 and the control data generation unit 305. Here, IDa is a parameter of the information "unregistered" which is input from the table manager 304 for (xa, ya) earlier, and it is an ID number that is unused in the area management table. When the area detection unit 302 outputs the rectangle registration signal to the control data generation unit 305, the area detection unit 302 outputs a position ascertainment signal {xc, yc, event A} together. Here, xc and yc are values of a center position of an area represented by {xb, yb, wb, hb}. When the area detection unit 302 outputs the rectangle registration signal to the control data generation unit 305, the area detection unit 302 may output {xc', yc', event A} together. Here, xc' and yc' are values of a center position of an area represented by {xa, ya, wa, ha}. By the way, operation conducted after the area detection unit 302 has output the rectangle registration signal to the table manager 304 and the control data generation unit 305 is the same as that described as to the first embodiment.

Figures 31A, 31B, 31C:
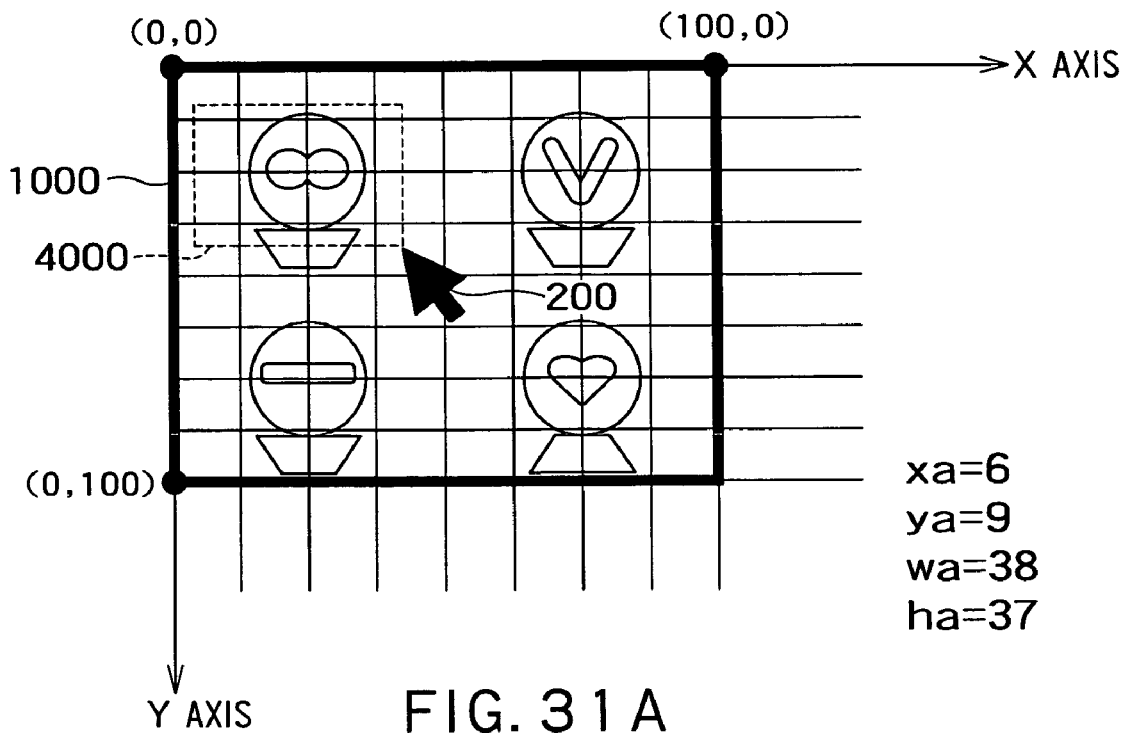
FIGS. 31A to 31C are a diagram showing a first example of how a composite video control instruction generator functions according to a second embodiment of the present invention.
Figure 32:
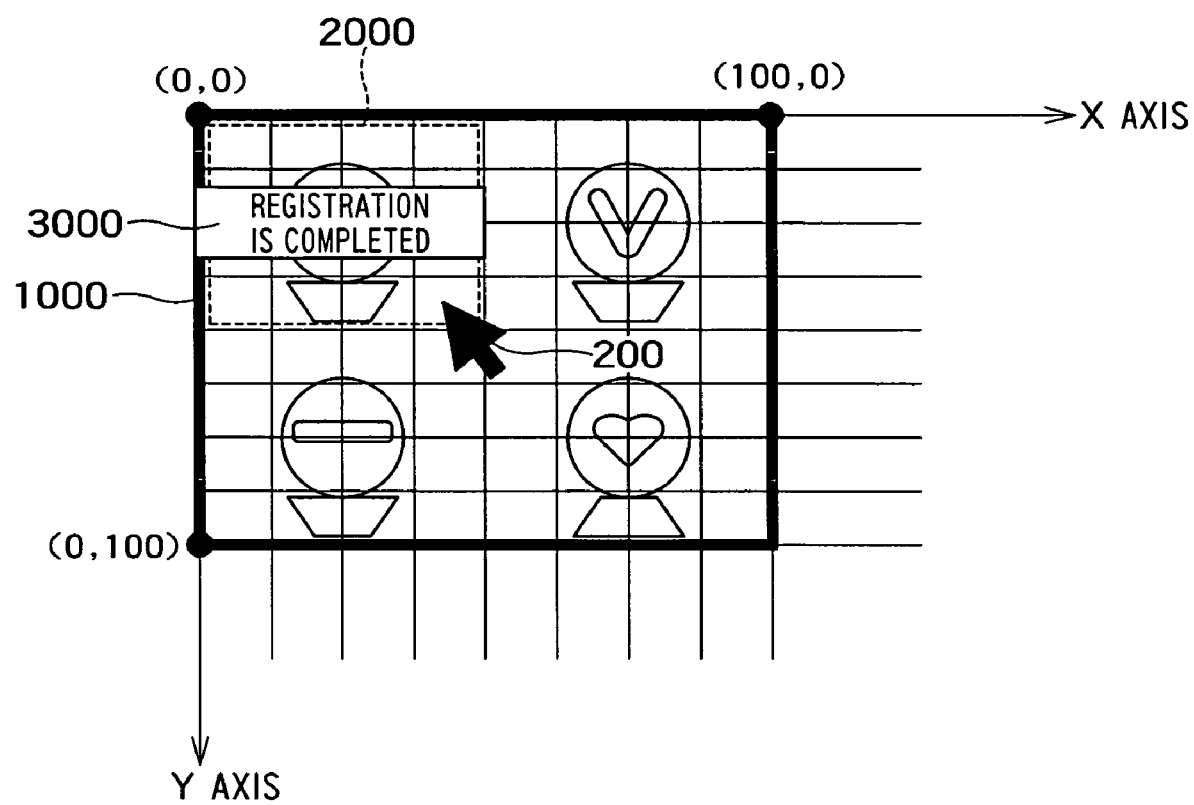
FIG. 32 is a diagram showing a second example of how a composite video control instruction generator functions according to a second embodiment of the present invention.

FIG. 31A shows a state obtained by conducting area specification represented by "xa=6, ya=9, wa=38, ha=37" when the area management table is in the initialized state. In this case, it follows that xb=0, yb=0, wb=50, hb=50, xc=25, yc=25. In other words, a rectangle registration signal {1, 0, 0, 50, 50, 1, event B} is generated in the composite video control instruction generator 300, and the area management table is updated as shown in FIG. 31C. Furthermore, the composite video control instruction generator 300 causes a rectangular frame 2000 shown in FIG. 32 to be displayed in the display area 1000, generates a rectangle registration packet shown in FIG. 31B, and transmits the rectangle registration packet to the conference server 2. As shown in FIG. 32, therefore, a portion displayed in the area-specified position in FIG. 31A is displayed on the display area 1000 so as to coincide with the rectangular frame 2000. By the way, at this time, the composite video control instruction generator 300 may create a dialog 3000 for notifying that the registration work has been completed, and display the dialogue around a position (xc, yc) on the display area 1000.

Figures 33A, 33B, 33C:
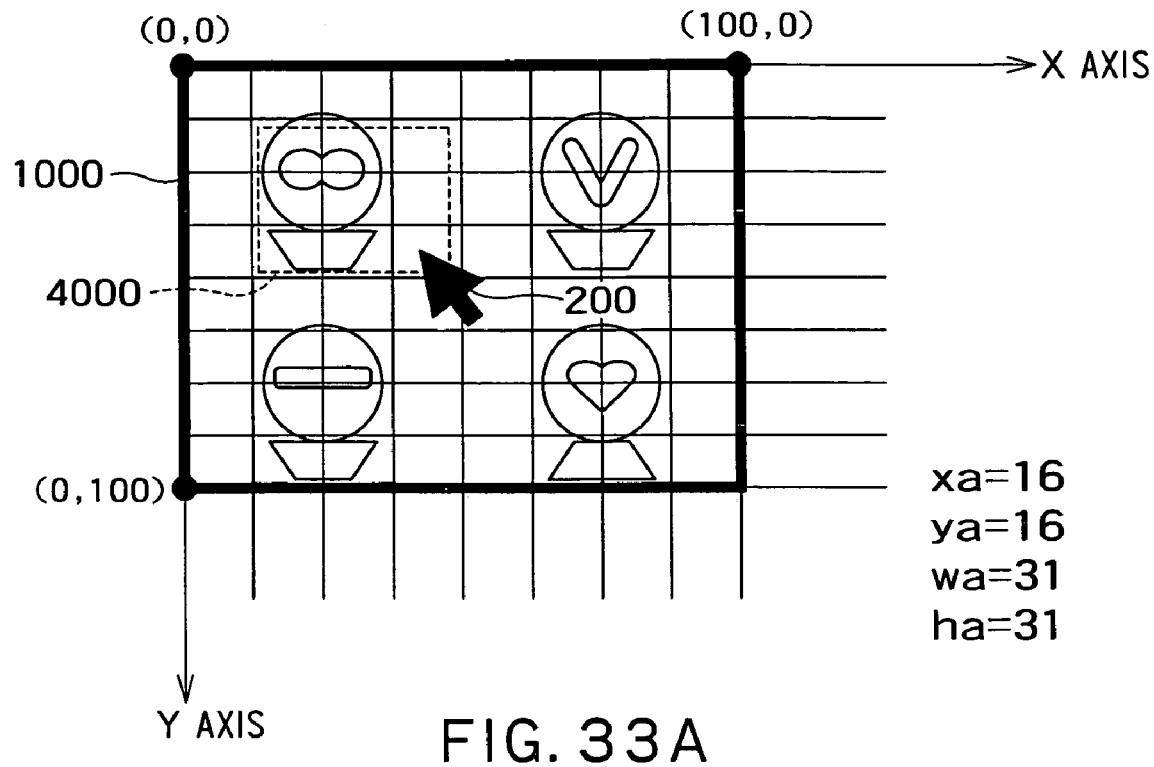
FIGS. 33A to 33C are a diagram showing a second example of how a composite video control instruction generator functions according to a second embodiment of the present invention.
Figure 34:
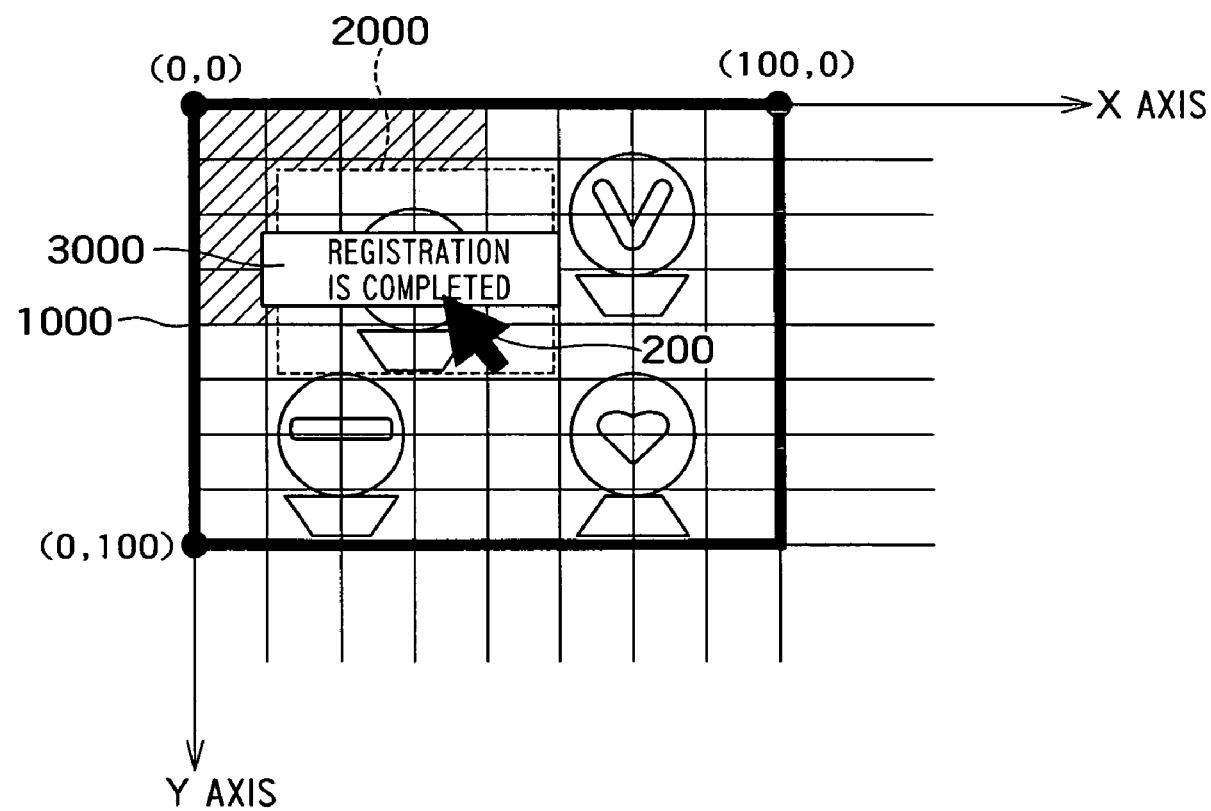
FIG. 34 is a diagram showing a second example of how a composite video control instruction generator functions according to a second embodiment of the present invention.

FIG. 33A shows a state obtained by conducting area specification represented by "xa=16, ya=16, wa=31, ha=31" when the area management table is in the initialized state. In this case, it follows that xb=12.5, yb=12.5, wb=50, hb=50, xc=37.5, yc=37.5. In other words, a rectangle registration signal {1, 12.5, 12.5, 50, 50, 1, event B} is generated in the composite video control instruction generator 300, and the area management table is updated as shown in FIG. 33C. Furthermore, the composite video control instruction generator 300 causes a rectangular frame 2000 shown in FIG. 34 to be displayed in the display area 1000, generates a rectangle registration packet shown in FIG. 33B, and transmits the rectangle registration packet to the conference server 2. As shown in FIG. 34, therefore, a portion displayed in the area-specified position in FIG. 33A is displayed on the display area 1000 so as to coincide with the rectangular frame 2000. By the way, at this time, the composite video control instruction generator 300 may create a dialog 3000 for notifying that the registration work has been completed, and display the dialogue around a position (xc, yc) on the display area 1000.

In the first embodiment, the method of displaying a rectangular frame so as to superpose it on a video image displayed in the display area 1000, by specifying a point has been described. In that case, the rectangular frame coincides with a video image. However, the displayed position largely deviates from the position displayed before specifying a point, for example, in the whole screen display in the display area 1000 or in the vicinity of the center in the display area 1000. On the other hand, by conducting area specification as described in the second embodiment instead of specifying a point, it is possible to display a rectangular frame without causing a large deviation from the position displayed before conducting area specification and cause a video image to coincide with the rectangular frame.

Third Embodiment

Figure 35:
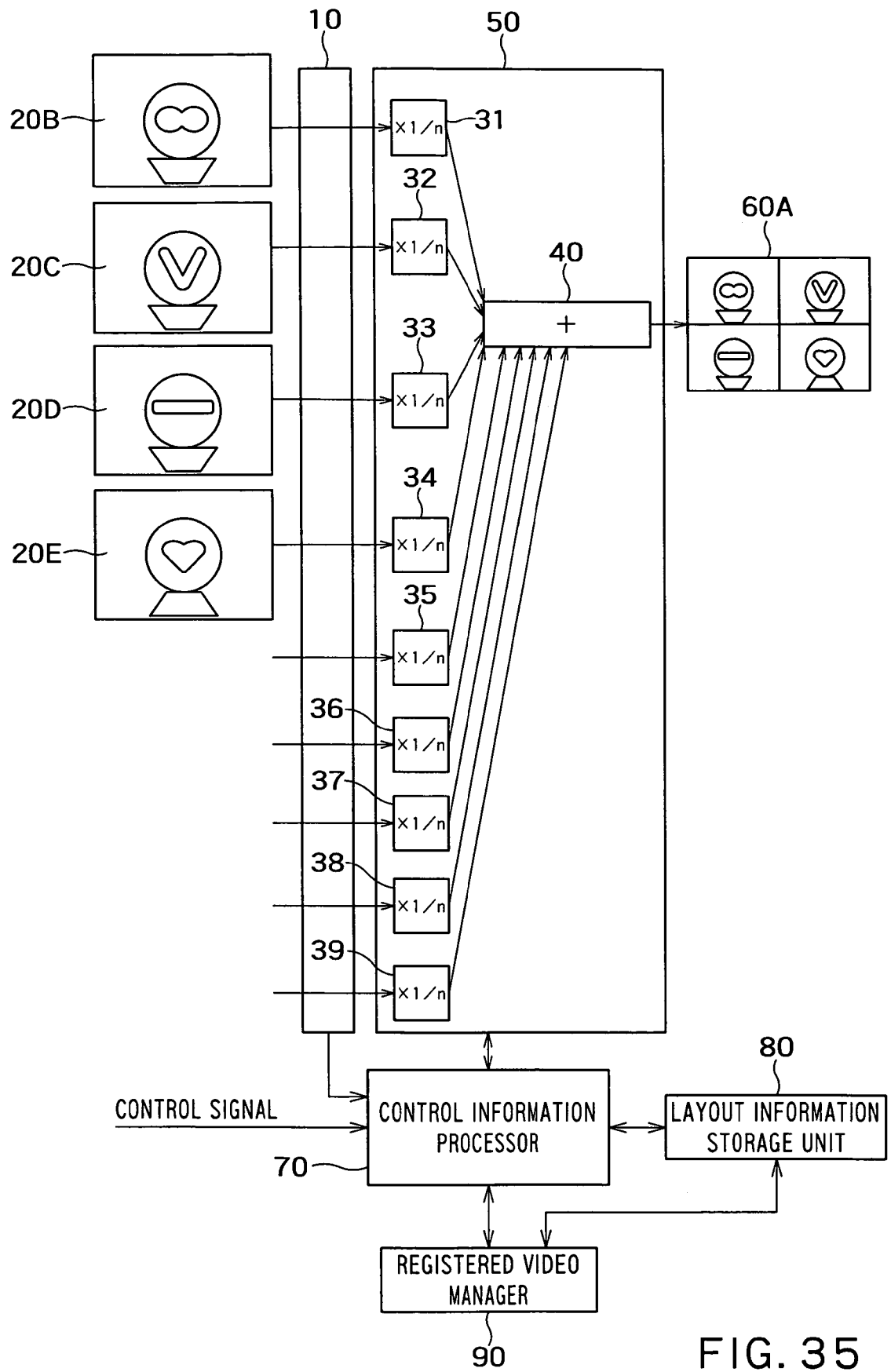
FIG. 35 is a block diagram showing a configuration of a conference server according to a third embodiment of the present invention.

Hereafter, a third embodiment of the present invention will be described with reference to FIGS. 35 to 37.

The first embodiment and the second embodiment have been described by taking the case where the conference server 2 receives four video images and composites them as an example. As described in the description of the first embodiment, however, the video composition processor 50 may have a configuration capable of composing five video sources equal to or more than five video sources. FIG. 35 shows a configuration of the conference server 2 capable of composing nine video sources. Only a difference in configuration of the conference server 2 in the present embodiment from that in the first embodiment and the second embodiment will now be described.

Figure 36A:
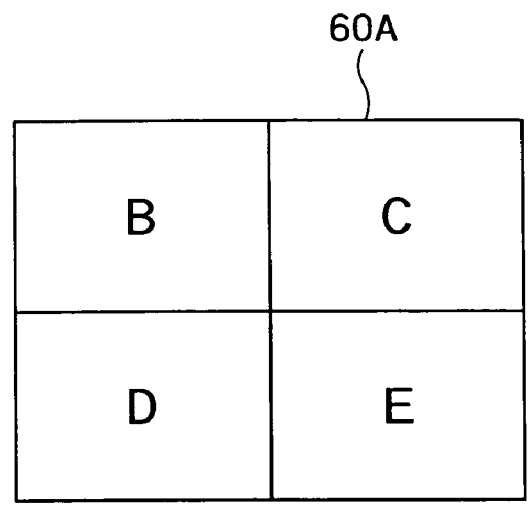
FIGS. 36A to 36C are a diagram showing relations between valid input video sources and a composite image according to a third embodiment of the present invention.
Figure 36B:
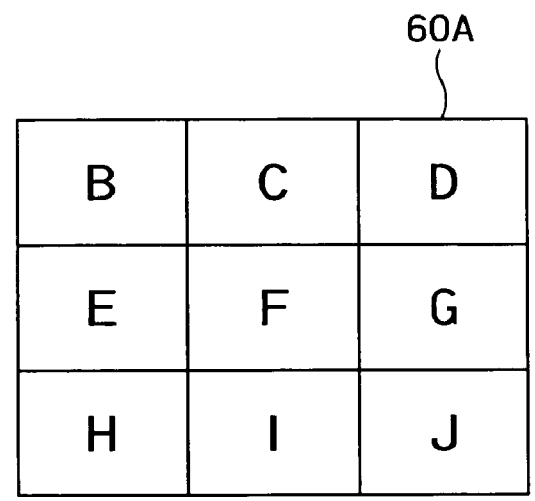

The conference server 2 in the present embodiment includes an input video detection unit 10. The input video detection unit 10 corresponds, for example, a detection unit. Besides the function of outputting a plurality of input sources to the video composition processor 50, the input image detection unit 10 has a function of detecting whether an input video source is present, creating a control signal by utilizing the detected information, and outputting the control signal to the control information processor 70. If, for example, the input video detection unit 10 judges that only four input video sources 20B, 20C, 20D and 20E are valid as shown in FIG. 35, the input video detection unit 10 creates a control signal for creating a composite video image 60A which includes B, C, D and E as shown in FIG. 36A, and outputs the control signal to the control information processor 70. Here, the control signal is information represented by {video source number, x, y, w, h, layer}. In the case of FIG. 36A, the control signal includes four information pieces {31, 0, 0, 50, 50, 1}, {32, 50, 0, 50, 50, 2}, {33, 0, 50, 50, 50, 3}, and {34, 50, 50, 50, 50, 4}. If, for example, the input video detection unit 10 judges that nine input video sources 20B, 20C, 20D, 20E, 20F, 20G, 20H, 20I and 20J are valid, the input video detection unit 10 creates a control signal for creating a composite video image 60A which includes B, C, D, E, F, G, H, I and J as shown in FIG. 36B, and outputs the control signal to the control information processor 70. The control signal created by the input image detection unit 10 and output to the control information processor 70 is analyzed by the control information processor 70. As a result, contents of the layout information management table utilized by the layout information storage unit 80 to manage arrangement positions of respective video sources in the composite video image are updated. If update of the layout information management table is completed, the control information processor 70 gives an order with contents described in the layout information management table to the video composition processor 50 and make the video composition processor 50 change the arrangement in the composite video image.

Figure 36C:
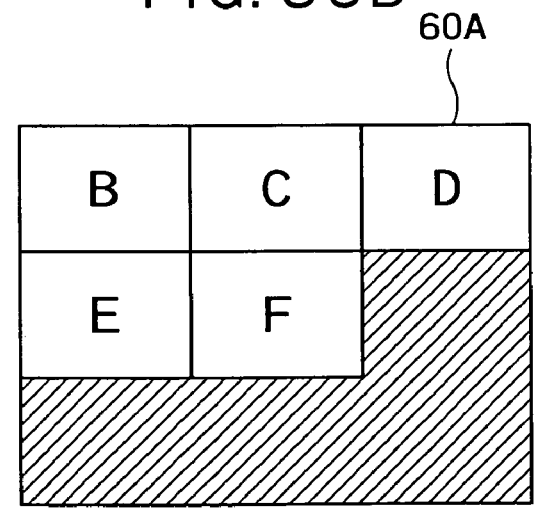

It is supposed that the input video detection unit 10 first judges only four input video sources 20B, 20C, 20D and 20E to be valid and thereafter an input video source 20F becomes additionally valid on the way. In that case, for example, the input video detection unit 10 creates a control signal for creating a composite video image 60A which includes B, C, D, E and F as shown in FIG. 36C, and outputs the control signal to the control information processor 70. By exercising such control, the user of the video conference terminal device 1 which receives and displays the composite image 60A can know that the input video source 20F has been added, i.e., that a new participant has joined in the conference in the multipoint video conference system, as a video image.

Figure 37A:
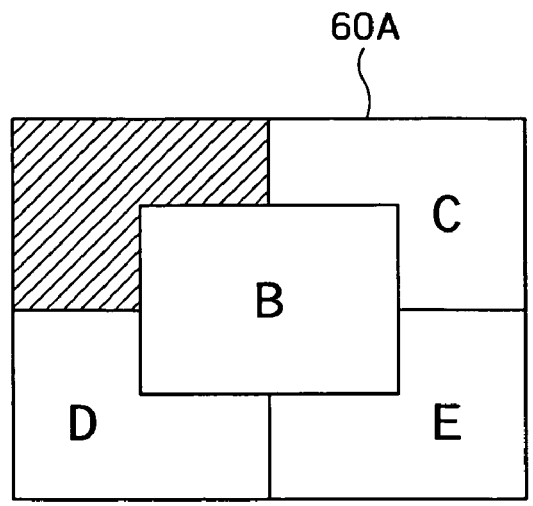
FIGS. 37A to 37C are a diagram showing relations among registered video images, input video sources, and a composite image according to a third embodiment of the present invention.

Upon being supplied with the control signal from the input video detection unit 10 in the present embodiment, the control information processor 70 does not immediately output a result obtained by analyzing contents contained in the control signal to the layout information storage unit 80 and update the layout information management table, but outputs a registered video source ID number ascertainment signal to the registered video manager 90. Upon being supplied with the registered video source ID number ascertainment signal, the registered video manager 90 ascertains information which includes an ID value contained in rectangle registration information and an ID number of a video source in a pair form as described with reference to the first embodiment, and outputs all video source numbers stored as pairs to the control information processor 70 as registered video source numbers. Upon being supplied with registered video source numbers, the control information processor 70 judges those video sources to be already registered by the video conference terminal device 1. On the other hand, upon being notified by the registered video manager 90 that a registered video source number is not present, as a result of outputting the registered video source ID number ascertainment signal, the control information processor 70 judges that a video source registered by the video conference terminal device is not present. For example, FIG. 37A shows a composite image 60A in situations where only four input video sources 20B, 20C, 20D and 20E are judged to be valid. It is supposed that arrangement positions are previously registered as to video images B and E respectively associated with 20B and 20E. In this case, the control information processor 70 is notified of the video source number 31 and the video source number 34 respectively associated with 20B and 20E as the already registered video source numbers from the registered video manager 90. The control information processor 70 judges those video sources to be in the state registered by the video conference terminal device 1.

Figure 37B:
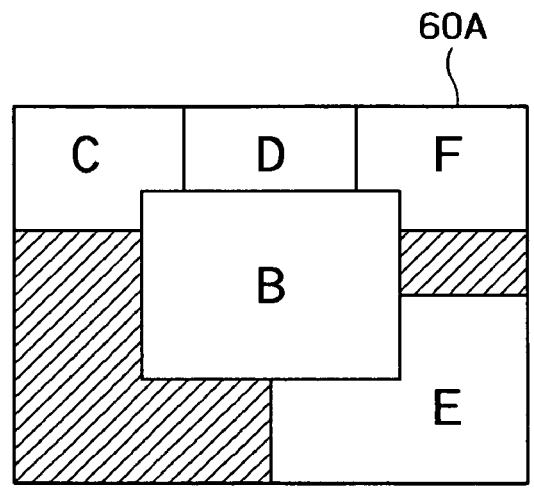
Figure 37C:
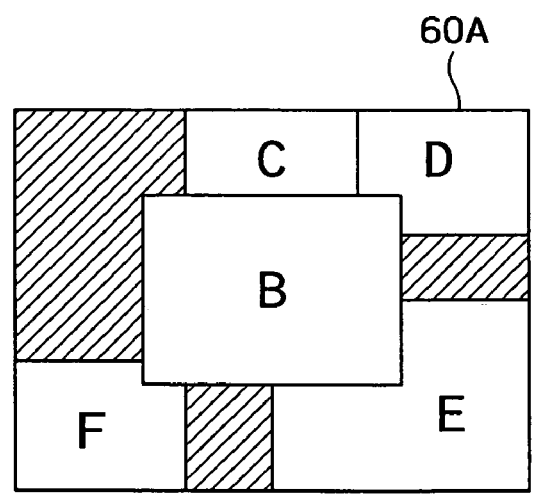

The control information processor 70 analyzes the control signal supplied from the input video detection unit 10, and determines utilizing the registered video manager 90 whether those video sources are already registered by the video conference terminal device 1. As to the already registered video sources, the control information processor 70 does not update contents associated with the already registered video sources in the layout information management table managed by the layout information storage unit 80. On the other hand, as to unregistered video sources, the control information processor 70 updates contents associated with the unregistered video sources in the layout information management table managed by the layout information storage unit 80. At that time, the control information processor 70 may change arrangement positions of them. For example, if it is not detected whether video sources are already registered as described in the present embodiment, a composite image shown in FIG. 36C is obtained. However, FIG. 37B shows the case where the video sources 20B and 20E are judged to be already registered and consequently 20C, 20D and 20F are put close together from the upper left to the upper right in the composite image 60A. FIG. 37C shows the case where the video sources 20B and 20E are judged to be already registered and consequently it is attempted to arrange 20C, 20D and 20F in positions ordered by the input video detection unit 10. If 20F is disposed in the original position in FIG. 37C, i.e., in the position of F in FIG. 36B, however, there is a possibility that 20F is hidden behind the registered B. Even in the position of G located to the right of F, there is a possibility that 20F is hidden behind the registered E. Therefore, 20F is disposed in the position of H. An algorithm for detecting "degree of overlapping" a registered video source and automatically modifying the arrangement position is mounted on the control information processor 70 or the layout information storage unit 80. As the algorithm for detecting "degree of overlapping" and automatically modifying the arrangement position, a method of searching for the arrangement position while considering the "degree of overlapping" is conceivable. For example, if it is possible to detect an arrangement position that yields overlap with a registered video source less than 30% in area ratio, the video source is disposed in the arrangement position. Otherwise, an arrangement position that yields overlap less than 50% is detected.

Heretofore, the case where the input video sources increase has been described. Substantially similar processing is also conducted in the case where the input video sources have decreased. For example, in situations where only four input video sources 20B, 20C, 20D and 20E are judged to be valid, 20E is supposed to become invalid. In this case, the input video detection unit 10 creates a control signal to create a composite video image including B, C and D, and outputs the control signal to the control information processor 70. In the case where the input video sources have decreased, subsequent processing is the same as that described as to the case where the input video sources have increased. By the way, by providing the control information processor 70 with a function of managing valid video source numbers and invalid video source numbers, it becomes possible in the layout information management table to conduct processing of setting information associated with the removed input video source to the invalid state.

In the multipoint video conference system utilizing the conference server in the present embodiment, the arrangement of video sources registered from the video conference terminal device 1 can be kept fixed, even when the arrangement of video sources in the composite video image is automatically changed by a control signal generated in the conference server 2 due to, for example, addition of a new user to the conference. In other words, the user of the video conference terminal device 1 can fix the positions of video images and prevent an unanticipated change of arrangement positions, by conducting registration operation.

Fourth Embodiment

Hereafter, a fourth embodiment of the present invention will be described with reference to FIGS. 2 to 6, FIG. 9, FIG. 26, and FIGS. 38 to 42.

In the present embodiment, configurations of the video conference terminal devices and the conference server are the same as those in the present embodiment. (As described later, however, the conference server in the present embodiment does not have the registered video manager unlike the first embodiment.) However, the present embodiment differs from the first embodiment in behavior of respective components. Although the description as to the first embodiment is partially repeated, the present embodiment will be described.

FIG. 3 shows a system configuration of a multipoint video conference system according to the present invention. FIG. 3 shows an example of the case where video conference is conducted at five points in the multipoint video conference system. The multipoint video conference system includes video conference terminal devices 1, 1B, 1C, 1D and 1E and a conference server 2. The video conference terminal devices 1, 1B, 1C, 1D and 1E are connected to the conference server 2 via a network 3.

In the present embodiment, the video conference terminal devices 1B, 1C, 1D and 1E have a function of transmitting video data to the conference server 2 by utilizing communication paths 3-1B, 3-1C, 3-1D and 3-1E, respectively. The conference server 2 has a function of composing video images received from the video conference terminal devices 1B, 1C, 1D and 1E into one video image in a state in which the conference server 2 is connected simultaneously to the video conference terminal devices 1, 1B, 1C, 1D and 1E, and transmitting a resultant composite video image to the video conference terminal device 1. The video data transmitted by the video conference terminal devices 1B, 1C, 1D and 1E may be video data created utilizing respective camera devices 4B, 4C, 4D and 4E, or video data stored in respective video conference terminal devices. On the other hand, the video conference terminal device 1 has a function of receiving video data transmitted by the conference server 2 by utilizing a communication path 3-11 between it and the conference server 2 and transmitting a control signal to the conference server 2 by utilizing a communication path 3-12. By the way, the video conference terminal device 1 may have a function of transmitting video data to the conference server 2 in the same way as the video conference terminal devices 1B, 1C, 1D and 1E. The video conference terminal devices 1B, 1C, 1D and 1E may have a function of receiving video data from the conference server 2 in the same way as the video conference terminal device 1. Since only video data is described in the present embodiment, description concerning transmission and reception of voice data which are originally an indispensable function of the multipoint video conference system will be omitted.

The video conference terminal devices 1, 1B, 1C, 1D and 1E are, for example, personal computers (hereafter referred to as PCs) or PDAs (Personal Digital Assistants) having a function of conducting communication via the network. The video conference terminal devices 1, 1B, 1C, 1D and 1E have a function of displaying video data received from the conference server 2. The present embodiment will now be described supposing that the video conference terminal device 1 is a PC of notebook type having a Windows OS of the Microsoft Corporation mounted thereon.

In the present embodiment, the conference server 2 has a function of receiving up to eight video data from the video conference terminal devices, and creating a composite video image from the eight video data.

FIG. 4 is an exterior oblique view with a display unit of the video conference terminal device 1 opened. The video conference terminal device 1 includes a computer main body 11 and a display unit 12. An LCD (Liquid Crystal Display) 13 forming a display panel is incorporated into the display unit 12. The LCD 13 is located substantially in the center of the display unit 12.

A desktop screen 100 is displayed on a screen display unit of the display unit 12 (on a display screen of the LCD 13). A window 101 and a pointer 200 of an application having a function of displaying video data received from the conference server 2 in a display area 1000 are displayed on the desktop screen (hereafter referred to simply as display screen) 100. By the way, since the display function of the window 101 and the display function and operation function of the pointer 200 are already mounted on ordinary PCs, description of them will be omitted.

The computer main body 11 has a thin box-shaped chassis. On a top surface of the computer main body 11, a pointing device 14 is disposed to conduct operation concerning the pointer 200. In addition, a network communication device 15 is incorporated in the computer main body 11. By the way, the pointing device 14 is disposed on the computer main body 11; however, for example, in a PC utilizing an external mouse, the mouse corresponds to the pointing device 14. The network communication device 15 is a device which executes network communication. The network communication device 15 includes, for example, a physical connector for connection to a network. The network communication device 15 executes data transfer according to a command input from a CPU in the computer main body 11. Its control is conducted according to a communication protocol stored in a memory in the computer main body 11.

FIG. 5 shows internal components according to the present invention in the video conference terminal device 1 shown in FIG. 4. In FIG. 4 and FIG. 5, expression of components (such as the CPU) that do not exert direct influence in implementing function improvements according to the present invention is omitted. Functions represented by the configuration shown in FIG. 5 may be implemented by causing the computer to execute a program generated using an ordinary programming technique or implemented in a hardware manner.

The video conference terminal device 1 includes a conference video display processor 400, and a composite video control instruction generator 300, which forms one great feature of the present embodiment, as its components. The video conference terminal device 1 is supposed to be a PC. The conference video display processor 400 and the composite video control instruction generator 300 can display drawing data created in them on the display screen 100 shown in FIG. 4 by utilizing a drawing function mounted on the PC. Furthermore, the conference video display processor 400 can receive video data via the communication path 3-11 shown in FIG. 3 by utilizing a function of a network communication processor 500. On the other hand, the composite video control instruction generator 300 can transmit control data via the communication path 3-12 shown in FIG. 3 by utilizing a function of a network communication processor 500.

The conference video display processor 400 includes a reception video display unit 401, a video data analysis processor 402, and a data reception control unit 403. The data reception control unit 403 acquires received data from the network communication processor 500, constructs encoded video data from data received via the network, and outputs the constructed encoded video data to the video data analysis processor 402. The video data analysis processor 402 constructs decoded video data that can be displayed, by decoding the input encoded video data, and outputs the decoded video data to the reception video display unit 401. The reception video display unit 401 has a function of creating and displaying the window 101 serving as the application. If video data that can be displayed is input, the reception video display unit 401 displays the video data as "video image" in the display area 1000 in the window 101.

The network communication processor 500 can conduct video data transfer by utilizing the communication path 3-11. The network communication processor 500 supports, for example, UDP/IP, RTP or the like as a communication protocol. The conference video display processor 400 can receive video data received from the conference server 2, via the network communication processor 500.

On the other hand, the composite video control instruction generator 300 which forms a feature of the present embodiment includes a pointer detection unit 301, an area detection unit 302, a frame display unit 303, a table manager 304, a control data generation unit 305 and a control data transmission processor 306.

First, operation conducted when the composite video control instruction generator 300 is started or initialized will now be described.

The table manager 304 creates and retains an area management table shown in FIG. 38, therein. FIG. 38 shows the area management table at the time of initialization. Identifying IDs (1, 2, 3, 4, 5, 6, 7, 8) are assigned individually to eight kinds of video sources that can be composed by the conference server 2. Parameter information x, y, w, h and layer is contained to indicate respective arrangement positions. Here, x, y, w and h indicate a position in which in the composite video the image video source identified by the ID are to be disposed and a size in the case where the video source is rectangular. Taking a rectangular area shown in FIG. 6B as an example, it follows that x=x1, y=y1, w=w1 and h=h1 . The layer indicates hierarchy information which is used by the conference server to discriminate the hierarchy relation between video sources when creating a composite video image. For example, if a video source is located on a kth layer, it follows that layer=k. A video source on the kth layer is located behind a video source on a (k−1)th layer by one layer. If a composite video image having a video source on the kth layer and a video source on the (k−1)th layer which overlap each other is created, the video source on the kth layer is partially hidden by the video source on the (k−1)th layer. If the composite video control instruction generator 300 is started or initialized, the area management table managed by the table manager 304 assumes the initialized state shown in FIG. 38.

If the composite video control instruction generator 300 is started or initialized, the area detection unit 302 acquires area management table information in the initial state from the table manager 304, and outputs the area management table information to the control data generation unit 305.

If the area management table information is input from the area detection unit 302, the control data generation unit 305 constructs a payload portion of the composite video control packet to convey the area management table information to the conference server 2. FIG. 39 shows an example of a payload portion of the composite video control packet in the case where the area management table information is initialized. In FIG. 39, each block has eight bits, a bit string is represented by a decimal number. Upon creating the composite video control packet, the control data generation unit 305 outputs it to the control data transmission processor 306.

If the composite video control packet is input from the control data generation unit 305, the control data transmission processor 306 outputs the control packet to the network communication processor 500 together with additional information such as destination address information of the network required to transmit the control packet to the conference server 2. If the composite video control packet with the additional information added is input from the control data transmission processor 306, the network communication processor 500 transmits the composite video control packet to the conference server 2 via the communication path 3-12.

Figure 40:
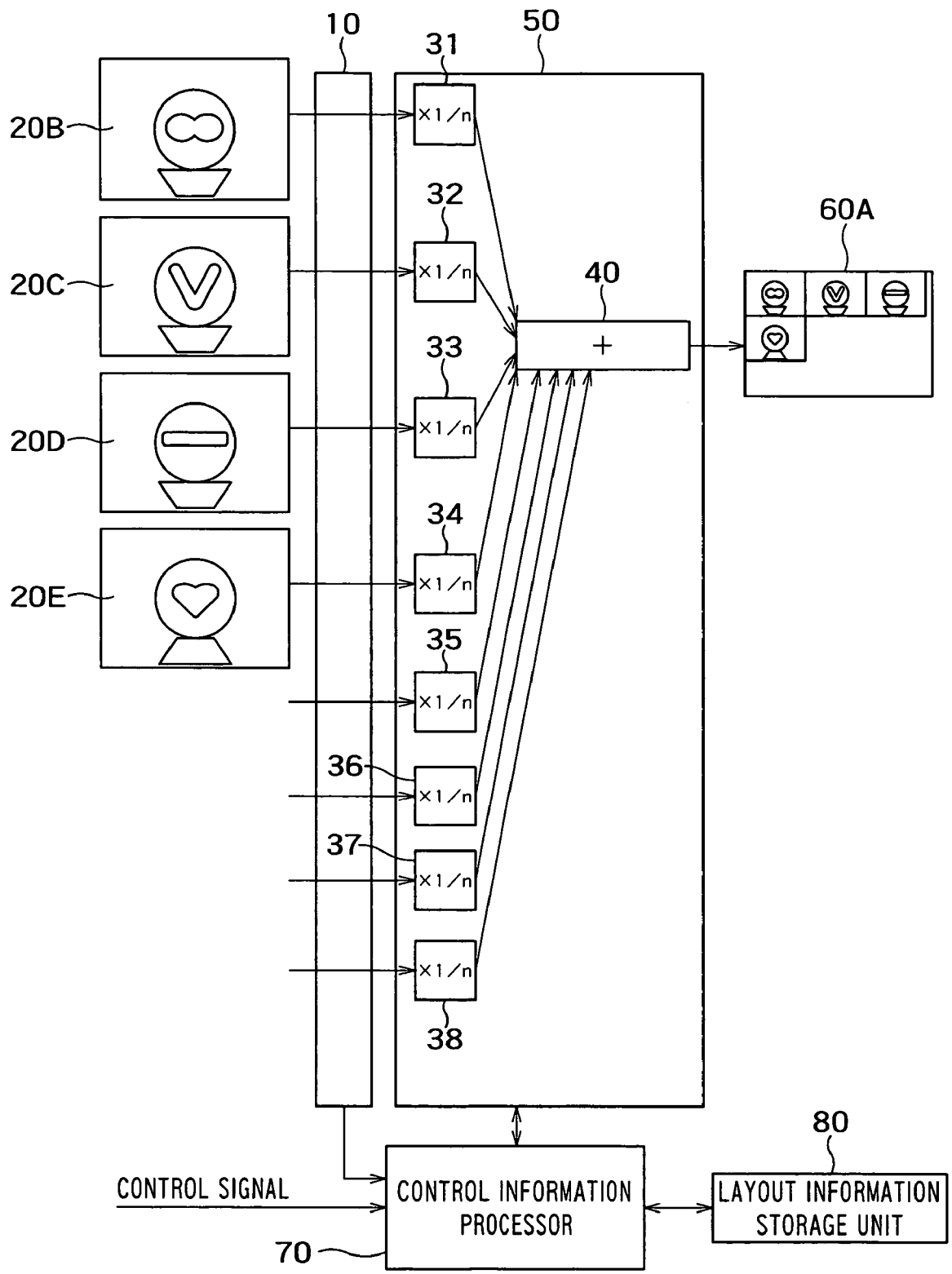
FIG. 40 is a block diagram showing a configuration of a conference server according to a fourth embodiment of the present invention.

If the conference server 2 having a configuration shown in FIG. 40 receives the composite video control packet from the video conference terminal device 1 via the communication path 3-12, the control information processor 70 in the conference server 2 analyzes the area management table information on the basis of the composite video control packet. The control information processor 70 creates a control signal for the video composition processor 50 according to the analyzed area management table information, outputs the control signal to the video composition processor 50, and thereby changes the composite video image so as to form a composite video image described in the area management table information. It is now supposed that the received video images (20B, 20C, 20D and 20E in FIG. 40) managed by the conference server 2 and ID numbers contained in the area management table information are associated with each other in one-to-one correspondence. Specifically, the control information processor 70 uses identifiers (31, 32, 33, 34, 35, 36, 37 and 38) of video processing blocks in the video composition processor 50 as identifiers of received video images. The control information processor 70 issues a control instruction to the video composition processor 50 by associating ID1 in the area management table information with the identifier 31 of the received video image, associating ID2 in the area management table information with the identifier 32 of the received video image, associating ID3 in the area management table information with the identifier 33 of the received video image, associating ID4 in the area management table information with the identifier 34 of the received video image, associating ID5 in the area management table information with the identifier 35 of the received video image, associating ID6 in the area management table information with the identifier 36 of the received video image, associating ID7 in the area management table information with the identifier 37 of the received video image, and associating ID8 in the area management table information with the identifier 38 of the received video image. By the way, in the conference server 2 as well, the position in the composite video image 60A is managed using X-Y coordinates with the horizontal direction and the vertical direction normalized to a value of 100 in the same way as the display area 1000 in the window 101 in the video conference terminal device 1. A received signal associated with an ID number can be disposed in a position, size and layer specified by the area management table information. Details concerning the conference server 2 will be described in detail later.

Subsequently, operation caused by user's operation after the composite video control instruction generator 300 is started or initialized will now be described.

The pointer detection unit 301 detects that the pointer 200 is on the display area 1000 in the window 101 on the display screen 100. If an operation event has occurred in that position, the pointer detection unit 301 detects the event. The operation event is generated by click caused by mouse operation, double-click, drag and drop, or the like. As shown in FIG. 5, the pointer detection unit 301 can manage the position of the pointer 200 and the position of the window 101 on the display screen 100 by managing the display screen 100 utilizing X'-Y' coordinates. Upon detecting that an operation event has occurred on the display area 1000, the pointer detection unit 301 outputs position information of the pointer 200 (represented utilizing X'-Y' coordinates) and operation event information (such as ON of the left click, OFF of the left click, and ON of the right click) to the area detection unit 302.

As shown in FIG. 5, the area detection unit 302 manages the display area 1000 in the window 101 by using X-Y coordinates. In the case of a valid operation event, the area detection unit 302 transforms the position information of the pointer 200 (represented utilizing the X'-Y' coordinates) input from the pointer detection unit 301 to X-Y coordinates, and recognizes the transformed values as position information of the pointer 200. In the case of an invalid operation event, the area detection unit 302 disregards the position information (represented utilizing the X'-Y' coordinates) of the pointer 200 and the operation event information. For example, if only ON of the left click and OFF of the left click are valid as operation events, the area detection unit 302 conducts position information analysis of the pointer 200 only when ON of the left click and OFF of the left click is performed. The relation between X-Y coordinates managed by the area detection unit 302 and the display area 1000 will now be described with reference to FIG. 6A. Representing a point in X-Y coordinates as (x, y), the area detection unit 302 manages, for example, an upper left-hand vertex of the display area 1000 as (0, 0), an upper right-hand vertex as (100, 0), a lower left-hand vertex as (0, 100), and a lower right-hand vertex as (100, 100). In other words, the area detection unit 302 manages positions on the display area 1000 by normalizing the horizontal direction and the vertical direction of the display area 1000 to the value of 100. For example, if ON of the left click has occurred in a position (x1, y1) shown in FIG. 6A, the area detection unit 302 recognizes information {x1, y1, event A}. Here, the event A indicates that the ON operation of the left click has been conducted. As internal processing, the information {x1, y1, event A} is defined as a "position ascertainment" signal. Upon recognizing the position ascertainment signal {x1, y1, event A}, the area detection unit 302 acquires the area management table from the table manager 304, and ascertains registered information in the area management table. If position information x1 and y1 represents a point that does not belong to any of the rectangular areas managed in the area management table, the area detection unit 302 terminates the processing concerning the position ascertainment signal {x1, y1, event A}. On the other hand, if position information x1 and y1 represents a point that belongs to the rectangular areas managed in the area management table, the area detection unit 302 ascertains the layer, and recognizes the ID number of the rectangular area located on the top layer and information (x, y, w, h, layer) relating thereto as rectangular area information {ID, x, y, w, h, layer}. Upon recognizing the rectangular area information {ID, x, y, w, h, layer}, the area detection unit 302 stores the information therein, and outputs the information to the frame display unit 303.

If the rectangular area information {ID, x, y, w, h, layer} is input from the area detection unit 302, the frame display unit 303 causes a rectangular frame 2000 to be displayed on the display area 1000 in the window 101 in the display screen 100 managed using the X-Y coordinates, by utilizing the values of x, y, w and h. FIG. 9 shows the rectangular frame 2000 displayed on the display area 1000 so as to be associated with the rectangular area information {ID=ID1, x=x1, y=y1, w=w1, h=h1, layer=l1 } when the rectangular area information is input. By the way, the rectangular frame 2000 may be a solid line besides the dotted line shown in FIG. 9. Furthermore, the display color of the frame may be changed according to the ID number. As described earlier, the area detection unit 302 stores the rectangular area information {ID, x, y, w, h, layer}. When the area detection unit 302 has deleted stored rectangular area information, the area detection unit 302 outputs a deletion instruction for the rectangular area information {ID, x, y, w, h, layer} to the frame display unit 303. If the deletion instruction is input, the frame display unit 303 executes processing so as not to display the specified rectangular frame. If the value of the rectangular area information {ID, x, y, w, h, layer} stored in the area detection unit 302 has not changed for a predetermined time, the area detection unit 302 deletes the stored rectangular area information. The area detection unit 302 may be configured so as to be able to store a plurality of rectangular area information pieces. Alternatively, the area detection unit 302 may be configured so as to be able to store only one rectangular area information piece therein. In this case, old rectangular area information is deleted when storing new rectangular area information. By the way, the area detection unit 302 can change the value of the rectangular area information {ID, x, y, w, h, layer} stored therein by "rectangular frame change processing" described below.

A method used by the user to move the display position of the pointer 200 and change the size and position of the rectangular frame displayed by the frame display unit 303 will now be described. The position of the pointer 200 is detected by the pointer detection unit 301 as described earlier. The pointer detection unit 301 outputs the position information of the pointer 200 (represented utilizing X'-Y' coordinates) and operation event information (such as ON of the left click, OFF of the left click, and ON of the right click) to the area detection unit 302. If the input operation event information is valid, the area detection unit 302 temporarily stores the position information of the pointer 200 (represented utilizing the X'-Y' coordinates) transformed into X-Y coordinates and operation event information. At this time, the area detection unit 302 determines whether the detected position in X-Y coordinates is a point that belongs to an area of the rectangular area information {ID, x, y, w, h, layer} stored therein. If the detected position does not belong to the area, the area detection unit 302 conducts processing concerning the "position ascertainment" signal described earlier. If it is judged that the detected position belongs to the area, the area detection unit 302 executes the "rectangular frame change processing" described below. The foregoing description of processing concerning the "position ascertainment" signal is description for the case where rectangular area information is not stored within the area detection unit 302.

Hereafter, "rectangular frame change processing" will be described with reference to FIG. 9.

First, it is now supposed that the pointer 200 is moved to a vertex of the rectangular frame 2000, and the left click is conducted there. It is also supposed that the pointer 200 is moved while maintaining the left click, and the left click is released after the movement. In this case, the pointer detection unit 301 detects the first left click, and inputs that information to the area detection unit 302. As a result, the area detection unit 302 recognizes start of "rectangular frame change processing" in which the vertex of the rectangular frame 2000 is specified. Subsequently, the pointer detection unit 301 detects the pointer movement, and inputs that information to the area detection unit 302. The area detection unit 302 can recognize it as processing for changing the size of the rectangular frame 2000. Furthermore, the pointer detection unit 301 detects that the left click has been released, and inputs that information to the area detection unit 302. As a result, the area detection unit 302 can recognize that processing for changing the size of the rectangular frame 2000 has been determined, i.e. the end of the "rectangular frame change processing." Upon recognizing that the processing is processing for changing the size of the rectangular frame 2000, the area detection unit 302 changes values of x, y, w, h in the rectangular area information {ID, x, y, w, h, layer} stored therein, as occasion demands, and outputs the changed rectangular area information to the frame display unit 303. For example, in the processing of changing the frame size by moving the position of the left-clicked vertex, the values of x, y, w and h are changed suitably so as to fix the diagonal position for the clicked vertex. In addition, when changing values of x, y, w and h in the rectangular area information {ID, x, y, w, h, layer}, the area detection unit 302 changes the information of x, y, w, h and layer of the associated ID in the area management table managed by the table manager 304, and outputs the changed area management table information to the control data generation unit 305 as occasion demands. Or in the middle of the processing for changing the size of the rectangular frame 2000, the area detection unit 302 outputs the rectangular area information only to the frame display unit 303 as occasion demands and thereby causes change processing to be conducted on the rectangular frame display in the display area 1000. When the end of the "rectangular frame change processing" has been recognized, the area detection unit 302 may change the information of x, y, w, h and layer of the associated ID in the area management table managed by the table manager 304, and output the changed area management table information to the control data generation unit 305. By the way, in the present embodiment, the aspect ratio of the rectangular frame is kept constant. If the pointer position does not satisfy the constant aspect ratio when the end of the "rectangular frame change processing" is recognized, the pointer position is automatically corrected to a point satisfying the constant aspect ratio in the pointer detection unit 301.

Subsequently, it is supposed that the pointer 200 is moved to a position other than a vertex although it is in the rectangular frame 2000, and the left click is conducted there. It is also supposed that the pointer 200 is moved while maintaining the left click, and the left click is released after the movement. In this case, the pointer detection unit 301 detects the first left click, and inputs that information to the area detection unit 302. As a result, the area detection unit 302 recognizes start of "rectangular frame change processing" in which the position other than the vertex of the rectangular frame 2000 is specified. Subsequently, the pointer detection unit 301 detects the pointer movement, and inputs that information to the area detection unit 302. The area detection unit 302 can recognize it as processing for changing the position of the rectangular frame 2000. Furthermore, the pointer detection unit 301 detects that the left click has been released, and inputs that information to the area detection unit 302. As a result, the area detection unit 302 can recognize that processing for changing the position of the rectangular frame 2000 has been determined, i.e. the end of the "rectangular frame change processing." Upon recognizing that the processing is processing for changing the position of the rectangular frame 2000, the area detection unit 302 changes values of x and y in the rectangular area information {ID, x, y, w, h, layer} stored therein, and outputs the changed rectangular area information to the frame display unit 303. For example, supposing that the frame size is not changed in the processing of changing the position, the values of x and y are changed suitably utilizing difference values between the pointer position recognized at the time of start of the "rectangular frame change processing" and the pointer position during the movement. In addition, when changing values of x, y, w and h in the rectangular area information {ID, x, y, w, h, layer}, the area detection unit 302 changes the information of x, y, w, h and layer of the associated ID in the area management table managed by the table manager 304, and outputs the changed area management table information to the control data generation unit 305 as occasion demands. Or in the middle of the processing for changing the size of the rectangular frame 2000, the area detection unit 302 outputs the rectangular area information only to the frame display unit 303 as occasion demands and thereby causes change processing to be conducted on the rectangular frame display in the display area 1000. When the end of the "rectangular frame change processing" has been recognized, the area detection unit 302 may change the information of x, y, w, h and layer of the associated ID in the area management table managed by the table manager 304, and output the changed area management table information to the control data generation unit 305.

When conducting the processing for changing the size or position of the rectangular frame 2000, the area detection unit 302 changes information of x, y, w, h and layer of the associated ID in the area management table managed by the table manager 304. In this time, the area detection unit 302 may exercise control to set the layer of the associated ID to 1 and dispose the associated video source in the top layer. In this case, the video source previously having 1 in the area management table is increased by one in layer value. If as a result the increased layer overlaps different registered information, the table manager 304 increases the value of the different registered layer by one. FIG. 41 shows the area management table in the case where the size of the rectangular frame has been changed from the initialized state. In this example, information associated with ID=3 is changed. Furthermore, as to the layer, the layer value associated with ID=3 has been changed to 1. Layer values associated with ID=1 and ID=2 have been changed to 2 and 3, respectively.

Processing conducted by the control data generation unit 305 and the control data transmission processor 306 has been described earlier as the operation when the composite video control instruction generator 300 is started or initialized.

Hereafter, a configuration and operation of the conference server 2 will be described.

FIG. 40 shows a configuration of the conference server 2 according to an embodiment of the present invention. In FIG. 40, expression of components (such as the CPU) that do not exert direct influence in implementing function improvements according to the present invention is omitted. The conference server 2 includes a layout information storage unit 80 in addition to the video composition processor 50 and the control information processor 70 in the conference server S in shown in FIG. 2. Furthermore, the control information processor 70 has expansion function in the present embodiment.

Functions represented by the configuration shown in FIG. 40 may be implemented by causing a computer to execute a program generated using an ordinary programming technique, or implemented in a hardware manner.

FIG. 40 shows a configuration which creates one composite video image 60A from four video sources (20B, 20C, 20D and 20E). In the present embodiment, however, the video composition processor 50 can compose eight video sources. FIG. 40 shows a configuration which creates only one composite image. Alternatively, a configuration which can create a plurality of composite images and deliver the composite images to different video conference terminal devices may also be used.

If the conference server 2 receives a composite video control packet from the video conference terminal device 1 via the communication path 3-12, the received composite video control packet is input to the control information processor 70. The control information processor 70 analyzes the area management table information on the basis of the input composite video control packet. The control information processor 70 creates a control signal for the video composition processor 50 according to the analyzed area management table information, and outputs the control signal to the video composition processor 50. The control information processor 70, for example, changes the composite video image by analyzing values of {x, y, w, h} contained in the area management table information and calculating values of the downscaling factors (1/n) of video sources so as to yield a composite video image described in the area management table information.

The control signal information output to the video composition processor 50 by the control information processor 70 is stored and managed in the layout information storage unit 80. The layout information storage unit 80 manages arrangement positions of video sources in the composite video image. The arrangement position is managed utilizing X-Y coordinates obtained by normalizing the horizontal direction and vertical direction of the composite video image to the value of 100 as shown in FIG. 26. Furthermore, the layout information storage unit 80 retains, for example, a layout information management table shown in FIG. 42, and manages arrangement positions of respective video sources by utilizing X-Y coordinates shown in FIG. 26. In the layout information management table of the present embodiment, numbers of size change circuits (31, 32, 33, 34, 35, 36, 37 and 38) included in the video composition processor 50 are used as IDs of respective video sources. Information of downscaling (1/n) as to the length of one side conducted by the size change circuits, and an arrangement position (x, y) with reference to the upper left end, a size (w, h) and a layer of each of the downscaled video sources are described in the layout information management table of the present embodiment. By the way, it is supposed in the present embodiment that each of video sources (20B, 20C, 20D, 20E and so on) and the composite video image 60A are equal in size and aspect ratio.

The arrangement positions of respective video sources stored and managed by the layout information storage unit 80 are updated according to an order issued by the control information processor 70 which has received a composite video control packet. The layout information storage unit 80 manages default values concerning the arrangements of respective video sources. At the time of initialization or the like, the control information processor 70 acquires default layout information from the layout information storage unit 80, and designates a composition method to the video composition processor 50. By the way, FIG. 42 shows an example of default layout information as well. It is supposed that the video sources are arranged so as not to overlap each other and layers of respective video sources are predetermined as default values.

Heretofore, detailed configurations and operations of the video conference terminal device 1 and the conference server 2 have been described as the fourth embodiment of the present invention. In the fourth embodiment, it becomes possible to implement the same effects as those of the first embodiment more simply by simplifying the internal control signals.

Hereafter, effects brought about by the first to fourth embodiments of the present invention will be described.

In a video conference terminal device having a function of merely displaying a composite image received from the conference server 2, the composite video image is nothing but one video image. It is not clear that the composite video image includes a plurality of video sources, and the boundaries between video sources are not clear, either. According to the embodiments, however, it becomes possible to detect the boundaries between the video sources contained in the composite video image. For example, by merely aligning the pointer with one point in the composite video image and conducting a simple operation such as click, it is possible to display a rectangular frame so as to superpose it on a video image displayed there. This rectangular frame represents a boundary of the video source in the composite video image. After the rectangular frame has been displayed, it becomes possible to freely the size and position of the video source having the detected boundary in the composite video image by changing the size and position of the rectangular frame with a combination of pointer and click operations.

Furthermore, it is possible to detect the boundaries of a plurality of video sources and freely change the size and position of each of the video sources having detected boundaries in the composite video image, on a unidirectional communication path used only to transmit a control signal from the video conference terminal device 1 to the conference server 2. In other words, it is not necessary to mount the processing for receiving the composite information described earlier.

Furthermore, since a rectangular frame which indicates a boundary of a video source is generated by the video conference terminal device 1, a change of the size or position of the rectangular frame itself can be implemented in real time. As a result, it is possible to provide the user who operates the video conference terminal device 1 with operation feeling free from a delay.

What is claimed is:

1. A video display apparatus comprising:
a receiving unit configured to receive a composite video image generated from a plurality of video sources;
a display unit configured to display the received composite video image;
an area manager configured to store area information pieces;
a position specification unit configured to specify a position on the composite video image displayed by the display unit;
an area selection unit configured to select an area information piece from the area information pieces stored in the area manager;
an area display unit configured to provide information indicating the area represented by the area information piece selected by the area selection unit to the display unit so as to superpose the information on the displayed composite video image;

an area change unit configured to change the information;

an area information update unit configured to update the area information piece selected by the area selection unit stored in the area manager according to the information obtained after the change; and a control signal transmission unit configured to generate an update control signal containing the area information piece after update, and transmit the update control signal to a generation source of the composite video image.

2. The video display apparatus according to claim 1, wherein the area information pieces include position information of an area on the composite video image, size information of the area, and an identifier identifying the area; and the area change unit changes at least one of the position information and the size information of the information.

3. The video display apparatus according to claim 1, wherein the position specification unit selects an area information piece of an area including the position specified.

4. The video display apparatus according to claim 1, wherein the area selection unit generates a default area information piece indicating a default area, the area manager stores the default area information piece generated by the area selection unit, the area display unit provides information indicating the area represented by the default area information piece generated by the area selection unit to the display unit so as to superpose the information on the displayed composite video image, and the control signal transmission unit generates a registration control signal containing the default area information piece and containing further position information indicating the position specified by the position specification unit, and transmits the registration control signal to the generation source of the composite video image.

5. The video display apparatus according to claim 1, further comprising:

an area specification unit configured to specify an area on the composite video image displayed by the display unit; and a predetermined area selection unit configured to specify a predetermined area information piece, on the basis of a position and a size of the area specified by the area specification unit;

wherein the area manager stores the predetermined area information piece, the area display unit provides information indicating an area represented by the predetermined area information piece specified by the predetermined area selection unit to the display unit so as to superpose the information on the composite video image, and the control signal transmission unit generates a registration control signal containing the predetermined area information piece specified by the predetermined area selection unit and containing predetermined position information indicating a predetermined position in the area specified by the area specification unit, and transmits the registration control signal to the generation source of the composite video image.

6. The video display apparatus according to claim 5, wherein the area specification unit specifies an area on the composite video image by dragging a pointer, and the predetermined position information is a position of a start point of the pointer when specifying the area by the pointer.

7. The video display apparatus according to claim 4, wherein the predetermined area information piece is a center position in the area specified by the area specification unit or the area specified by the default information piece.

8. A video composition delivery apparatus, comprising:

a video source receiving unit configured to receive video sources of a composite video image;

a layout information manager configured to manage layout information pieces including an identifier identifying a respective video source, each layout information piece indicating the layout of an image represented by the respective video source on the composite video image;

a composite video generation unit configured to generate the composite video image from the video sources received by the video source receiving unit, by using the layout information pieces;

a transmitting unit configured to transmit the generated composite video image to a destination device;

a control signal receiving unit configured to receive an update control signal from the destination device, the update control signal containing an area information piece indicating an area on the composite video image;

a video manager configured to manage a corresponding relation between the identifier of a video source and a further identifier identifying the area information piece contained in the update control signal; and a layout information update unit configured to update the layout information piece of a video source associated with the further identifier according to the area information piece contained in the update control signal.

9. The video composition delivery apparatus according to claim 8, wherein the control signal receiving unit receives a registration control signal from the destination device, the registration control signal containing a position information which indicates a position on the composite video image, and an area information piece which indicates an area on the composite video image, the video manager specifies a video source corresponding to the position indicated by the position information contained in the registration control signal, and relates an identifier of the specified video source with the further identifier identifying the area information piece contained in the registration control signal, and the layout information update unit updates a layout information piece of the specified video source according to the position information and the area information piece contained in the registration control signal.

10. The video composition delivery apparatus according to claim 8, further comprising a detection unit configured to detect the number of video sources received by the video source receiving unit, wherein if the number of video sources received by the video source receiving unit has increased, the layout information update unit determines positions and sizes of video sources whose identifiers are not related with further identifiers in the video manager, among the video sources received by the video source receiving unit, and updates layout information pieces of the video sources whose identifiers are not related with further identifiers, by the determined positions and sizes.

11. The video composition delivery apparatus according to claim 10, wherein when updating the layout information pieces of the video sources, the layout information update unit determines positions and sizes of the video sources such that a ratio of an area overlapping between a video source to be updated in layout information piece and a video source not to be updated in layout information piece to an area of the video source to be updated in layout information, becomes a definite ratio or less.

12. The video composition delivery apparatus according to claim 9, further comprising a detection unit which detects the number of video sources received by the video source receiving unit, wherein if the number of video sources received by the video source receiving unit has decreased, the layout information update unit determines positions and sizes of video sources whose identifiers are not related with further identifiers in the video manager, among the video sources received by the video source receiving unit, and updates layout information pieces of the video sources whose identifiers are not related with further identifiers, by the determined positions and sizes.

13. The video composition delivery apparatus according to claim 12, wherein when updating the layout information pieces of the video sources, the layout information update unit determines positions and sizes of the video sources a ratio of an area overlapping between a video source to be updated in layout information piece and a video source not to be updated in layout information piece to an area of the video source to be updated in layout information, becomes a definite ratio or less.

14. A video delivery system comprising a video composition delivery apparatus configured to generate a composite video image from video sources and a video display apparatus configured to receive the composite video image from the video composition delivery apparatus to display the received composite video image:

the video display apparatus including:

a receiving unit configured to receive the composite video image from the video composition delivery apparatus, a display unit configured to display the received composite video image, an area manager configured to store area information pieces, a position specification unit configured to specify a position on the composite video image displayed by the display unit, an area selection unit configured to select an area information piece indicating an area including the position specified by the position specification unit from the area information pieces stored in the area manager, an area display unit configured to provide information indicating the area represented by the area information piece selected by the area selection unit to the display unit so as to superpose the information on the displayed composite video image, an area change unit configured to change the information provided by the area display unit, an area information update unit configured to update the area information piece selected by the area selection unit according to the information obtained after the change, and a control signal transmission unit configured to generate an update control signal containing the area information piece after update and a first identifier identifying the area information piece after update, and configured to transmit the update control signal to the video composition delivery apparatus, the video composition delivery apparatus including:

a video source receiving unit configured to receive video sources, a layout information manager configured to manage layout information pieces including a second identifier identifying a respective video source, the layout information piece indicating the layout of an image represented by the respective video source on the composite video image, a composite video generation unit configured to generate the composite video image from the video sources received by the video source receiving unit, by using the layout information pieces, a transmitting unit configured to transmit the generated composite video image to the video display apparatus, a control signal receiving unit configured to receive the update control signal from the video display apparatus, a video manager configured to manage a corresponding relation between the second identifier of a video source and the first identifier, and a layout information update unit configured to update the layout information piece of a video source associated with the first according to the area information piece contained in the update control signal.

15. The video delivery system according to claim 14, wherein the area selection unit in the video display apparatus generates a default area information piece indicating an default area, the area manager in the video display apparatus stores the default area information piece generated by the area selection unit, the area display unit in the video display apparatus provides information indicating the default area represented by the default area information piece generated by the area selection unit to the display unit so as to superpose the information on the displayed composite video image the control signal transmission unit in the video display apparatus generates a registration control signal containing the default area information piece and containing further position information indicating the position specified by the position specification unit, and transmits the registration control signal to the video composition delivery apparatus, the control signal receiving unit in the video composition delivery apparatus receives the registration control signal from the video display apparatus, the video manager in the video composition delivery apparatus specifies a video source on the position indicated by the registration control signal, and the layout information update unit in the video composition delivery apparatus updates a layout information piece of the specified video source according to the registration control signal.

16. The video delivery system according to claim 14, the video display apparatus further including:

an area specification unit configured to specify an area on the composite video image displayed by the display unit; and a predetermined area selection unit configured to specify a predetermined area information piece, on the basis of a position and a size of the area specified by the area specification unit, wherein the area manager in the video display apparatus stores the predetermined area information piece, the area display unit in the video display apparatus provides information indicating an area represented by the predetermined area information piece specified by the predetermined area selection unit to the display unit so as to superpose the information on the composite video image, and the control signal transmission unit in the video display apparatus generates a registration control signal containing the area information piece specified by the predetermined area selection unit and containing predetermined position information indicating a predetermined position in the area specified by the area specification unit, and transmits the registration control signal to the generation source of the composite video image, the control signal receiving unit in the video composition delivery apparatus receives the registration control signal from the video display apparatus, the video manager in the video composition delivery apparatus specifies a video source on the position indicated by the registration control signal, and the layout information update unit in the video composition delivery apparatus updates a layout information piece of the specified video source according to the registration control signal.

* * * * *